United States Patent
Damnjanovic et al.

(10) Patent No.: US 10,484,979 B2
(45) Date of Patent: Nov. 19, 2019

(54) FAST ENHANCED COMPONENT CARRIER ACTIVATION

(71) Applicant: QUALCOMM Incorporated, San Diego, CA (US)

(72) Inventors: Jelena Damnjanovic, Del Mar, CA (US); Wanshi Chen, San Diego, CA (US); Aleksandar Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 15/045,423

(22) Filed: Feb. 17, 2016

(65) Prior Publication Data

US 2016/0255611 A1 Sep. 1, 2016

Related U.S. Application Data

(60) Provisional application No. 62/126,414, filed on Feb. 27, 2015.

(51) Int. Cl.
*H04W 72/04* (2009.01)
*H04L 5/00* (2006.01)
(Continued)

(52) U.S. Cl.
CPC ........... *H04W 72/042* (2013.01); *H04L 5/001* (2013.01); *H04L 5/0087* (2013.01);
(Continued)

(58) Field of Classification Search
None
See application file for complete search history.

(56) References Cited

U.S. PATENT DOCUMENTS

| | | | |
|---|---|---|---|
| 2011/0274074 A1 | 11/2011 | Lee et al. | |
| 2012/0069802 A1* | 3/2012 | Chen | H04L 5/001 370/329 |

(Continued)

FOREIGN PATENT DOCUMENTS

| | | |
|---|---|---|
| WO | WO-2011116365 A2 | 9/2011 |
| WO | WO-2011142544 A2 | 11/2011 |

(Continued)

OTHER PUBLICATIONS

ISA/EPO, Partial International Search Report of the International Searching Authority, Int'l. App. No. PCT/US2016/018512, dated May 10, 2016, European Patent Office, Rijswijk, NL, 9 pgs.

(Continued)

*Primary Examiner* — Jeffrey M Rutkowski
*Assistant Examiner* — Basil Ma
(74) *Attorney, Agent, or Firm* — Holland & Hart LLP

(57) ABSTRACT

Methods, systems, and devices for wireless communication are described. A user equipment (UE) may be configured for carrier aggregation (CA) operation. The CA configuration may include multiple component carriers (CCs), including an enhanced component carrier (eCC). One CC of the CA configuration may be employed to signal channel availability of another CC of the CA configuration. For instance, a primary CC that utilizes licensed frequency bandwidth may signal channel availability of an eCC that utilizes unlicensed frequency bandwidth. This indication of channel availability may be sent before or after a clear channel assessment (CCA). Additionally, the indication of channel availability may be employed in both self- and cross-carrier scheduling configurations.

18 Claims, 20 Drawing Sheets

(51) Int. Cl.
*H04L 27/00* (2006.01)
*H04L 5/14* (2006.01)

(52) U.S. Cl.
CPC ........ *H04L 5/0098* (2013.01); *H04L 27/0006* (2013.01); *H04W 72/0453* (2013.01); *H04L 5/0032* (2013.01); *H04L 5/0064* (2013.01); *H04L 5/1469* (2013.01)

(56) References Cited

U.S. PATENT DOCUMENTS

| | | |
|---|---|---|
| 2012/0140743 A1 | 6/2012 | Pelletier et al. |
| 2012/0178445 A1* | 7/2012 | Dalsgaard ............. H04W 72/02 455/434 |
| 2012/0327910 A1* | 12/2012 | Dalsgaard ............. H04L 5/0098 370/335 |
| 2013/0016676 A1* | 1/2013 | Lohr .................... H04L 1/0026 370/329 |
| 2013/0235826 A1 | 9/2013 | Nakao et al. |
| 2014/0023016 A1 | 1/2014 | Mildh et al. |
| 2015/0181593 A1* | 6/2015 | Kim ................. H04W 52/0216 370/329 |
| 2015/0189574 A1* | 7/2015 | Ng ........................ H04W 24/08 370/252 |
| 2015/0223244 A1* | 8/2015 | Tabet .................... H04W 72/12 370/329 |
| 2017/0215179 A1* | 7/2017 | Choi ................. H04W 72/0413 |

FOREIGN PATENT DOCUMENTS

| | | |
|---|---|---|
| WO | WO-2012114150 A1 | 8/2012 |
| WO | WO-2013113158 A1 | 8/2013 |

OTHER PUBLICATIONS

ISA/EP, International Search Report and Written Opinion of the International Searching Authority, Int'l. App. No. PCT/US2016/018512, dated Aug. 2, 2016, European Patent Office, Rijswijk, NL, 27 pgs.

ZTE, "DRX and Activation/Deactivation," 3GPP TSG RAN WG2 #69bis, R2-102177, Beijing, China, Apr. 12-16, 2010, 4 pgs., XP_50422587A, 3rd Generation Partnership Project.

* cited by examiner

FAST ENHANCED COMPONENT CARRIER ACTIVATION

CROSS REFERENCES

The present Application for Patent claims priority to U.S. Provisional Patent Application No. 62/126,414 by Damnjanovic, et al., entitled "Fast eCC Activation," filed Feb. 27, 2015, assigned to the assignee hereof.

BACKGROUND

The following relates generally to wireless communication, and more specifically to fast enhanced component carrier (eCC) activation. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, wireless communications systems may utilize unlicensed frequency spectrum to exchange control information and data between devices. Because the frequency resources of this spectrum may be shared by multiple, competing users and system operators, devices may need to monitor such resources to determine whether they are available for communication. Devices performing such monitoring may expend significant resources (e.g., power, time, etc.) which could be preserved with a reduction of monitoring or with planned monitoring.

SUMMARY

A user equipment (UE) may be configured with a first component carrier (CC) that utilizes a licensed frequency bandwidth and a second CC that utilizes an unlicensed frequency bandwidth. The UE may receive a control signal on the first CC, which may indicate a channel availability on the second CC. In some examples, the UE may monitor the second CC upon receiving the indication of channel availability. The UE may, in some cases, initiate a monitoring timer; and the UE may cease monitoring if the timer expires before the UE determines that a base station has secured a channel of the second CC. Fast eCC activation may be supported for both self- and cross-carrier scheduled CCs. For instance, the UE may receive a physical downlink control channel (PDCCH) message or a physical downlink shared channel (PDSCH) message on the second CC, which may schedule resources of the second CC. In some examples, the UE may receive a PDCCH message on the first CC, which may schedules resources of the second CC.

A method of wireless communication is described. The method may include receiving signaling indicative of a CA configuration comprising a first CC and a second CC, wherein the first CC comprises a primary carrier and the second CC comprises a secondary carrier, and receiving a control signal on the first CC indicative of a channel availability on the second CC.

An apparatus for wireless communication is described. The apparatus may include means for receiving signaling indicative of a CA configuration comprising a first CC and a second CC, wherein the first CC comprises a primary carrier and the second CC comprises a secondary carrier, and means for receiving a control signal on the first CC indicative of a channel availability on the second CC.

A further apparatus for wireless communication is described. The apparatus may include a processor, memory in electronic communication with the processor, and instructions stored in the memory and operable, when executed by the processor, to cause the apparatus to receive signaling indicative of a CA configuration comprising a first CC and a second CC, wherein the first CC comprises a primary carrier and the second CC comprises a secondary carrier, and receive a control signal on the first CC indicative of a channel availability on the second CC.

A non-transitory computer-readable medium storing code for wireless communication is described. The code may include instructions executable to receive signaling indicative of a CA configuration comprising a first CC and a second CC, wherein the first CC comprises a primary carrier and the second CC comprises a secondary carrier, and receive a control signal on the first CC indicative of a channel availability on the second CC.

Some examples of the method, apparatuses, or non-transitory computer-readable medium described herein may further include processes, features, means, or instructions for monitoring the second CC in response to the received control signal. In some cases, the primary carrier may utilize a licensed frequency bandwidth and the secondary carrier may utilize an unlicensed frequency bandwidth. At times, the primary carrier may utilize an unlicensed frequency bandwidth and the secondary carrier utilizes another unlicensed frequency bandwidth. Additionally or alternatively, some examples may include processes, features, means, or instructions for initiating a monitoring timer based at least in part on the monitoring.

Some examples of the method, apparatuses, or non-transitory computer-readable medium described herein may further include processes, features, means, or instructions for receiving a preamble transmission on the second CC, and restarting the monitoring timer in response to the received preamble transmission. Additionally or alternatively, some examples may include processes, features, means, or instructions for determining that the monitoring timer has expired before a preamble transmission is received on the second CC, and ceasing the monitoring of the second CC.

Some examples of the method, apparatuses, or non-transitory computer-readable medium described herein may further include processes, features, means, or instructions for receiving a PDCCH or PDSCH message on the second CC, wherein the PDCCH or PDSCH message schedules resources of the second CC. Additionally or alternatively, some examples may include processes, features, means, or instructions for receiving a PDCCH message on the first CC, wherein the PDCCH message schedules resources of the second CC.

In some examples of the method, apparatuses, or non-transitory computer-readable medium described herein, a duration of transmission time interval (TTIs) of the first CC are different from a duration of TTIs of the second CC, and wherein the PDCCH message is transmitted in a TTI of the first CC and assigns a TTI of the second CC that at least partially overlaps in time with the TTI of the first CC.

Additionally or alternatively, some examples may include processes, features, means, or instructions for monitoring the first CC for the PDCCH message beginning at a first determinative time after receiving the control signal, monitoring the second CC beginning at a second determinative time after receiving the control signal, and the first determinative time comprises a number of TTIs of the first CC and second determinative time comprises a number of TTIs of the second CC.

In some examples of the method, apparatuses, or non-transitory computer-readable medium described herein, a duration of TTIs of the first CC are different from a duration of TTIs of the second CC, and wherein the PDCCH message is transmitted in a TTI of the first CC and assigns a TTI of the second CC that at least partially overlaps in time with a subsequent TTI of the first CC. Additionally or alternatively, some examples may include processes, features, means, or instructions for monitoring the first CC for the PDCCH message beginning at a first determinative time after receiving the control signal, and monitoring the second CC for a data channel in response to receiving the PDCCH message.

In some examples of the method, apparatuses, or non-transitory computer-readable medium described herein, the control signal comprises a physical channel. Additionally or alternatively, in some examples the control signal comprises a subband of the bandwidth of the first CC.

In some examples of the method, apparatuses, or non-transitory computer-readable medium described herein, the physical channel comprises a PDCCH format for UEs configured to monitor the second CC upon receipt of the control signal. Additionally or alternatively, in some examples the primary carrier comprises a PCC and the secondary carrier comprises an eCC.

A method of wireless communication is described. The method may include transmitting signaling indicative of a carrier aggregation configuration comprising a first CC and a second CC, wherein the first CC comprises a primary carrier and the second CC comprises a secondary carrier, and transmitting a control signal on the first CC indicative of a channel availability on the second CC.

An apparatus for wireless communication is described. The apparatus may include means for transmitting signaling indicative of a carrier aggregation configuration comprising a first CC and a second CC, wherein the first CC comprises a primary carrier and the second CC comprises a secondary carrier, and means for transmitting a control signal on the first CC indicative of a channel availability on the second CC.

A further apparatus for wireless communication is described. The apparatus may include a processor, memory in electronic communication with the processor, and instructions stored in the memory and operable, when executed by the processor, to cause the apparatus to transmit signaling indicative of a carrier aggregation configuration comprising a first CC and a second CC, wherein the first CC comprises a primary carrier and the second CC comprises a secondary carrier, and transmit a control signal on the first CC indicative of a channel availability on the second CC.

A non-transitory computer-readable medium storing code for wireless communication is described. The code may include instructions executable to transmit signaling indicative of a carrier aggregation configuration comprising a first CC and a second CC, wherein the first CC comprises a primary carrier and the second CC comprises a secondary carrier, and transmit a control signal on the first CC indicative of a channel availability on the second CC.

In some examples of the method, apparatuses, or non-transitory computer-readable medium described herein, transmitting the control signal comprises multicasting the control signal to a plurality of user equipment (UE) configured to monitor the second CC upon receipt of the control signal. In some cases, the primary carrier may utilize a licensed frequency bandwidth and the secondary carrier may utilize an unlicensed frequency bandwidth. At times, the primary carrier may utilize an unlicensed frequency bandwidth and the secondary carrier utilizes another unlicensed frequency bandwidth. Additionally or alternatively, some examples may include processes, features, means, or instructions for determining that a channel of the second CC is available for communication after transmitting the control signal.

Some examples of the method, apparatuses, or non-transitory computer-readable medium described herein may further include processes, features, means, or instructions for transmitting a preamble on the second CC. Additionally or alternatively, some examples may include processes, features, means, or instructions for determining that a channel of the second CC is available for communication, wherein the control signal is transmitted after the determination that the channel of the second CC is available.

Some examples of the method, apparatuses, or non-transitory computer-readable medium described herein may further include processes, features, means, or instructions for transmitting a channel usage beacon on the second CC. Additionally or alternatively, some examples may include processes, features, means, or instructions for transmitting a PDCCH or a PDSCH on the second CC, wherein the PDCCH or the PDSCH schedules resources of the second CC.

Some examples of the method, apparatuses, or non-transitory computer-readable medium described herein may further include processes, features, means, or instructions for transmitting a PDCCH message on the first CC, wherein the PDCCH message schedules resources of the second CC. Additionally or alternatively, in some examples a duration of transmission time intervals (TTIs) of the first CC are different from a duration of TTIs of the second CC, and wherein the PDCCH message is transmitted in a TTI of the first CC and assigns a TTI of the second CC that at least partially overlaps in time with the TTI of the first CC.

In some examples of the method, apparatuses, or non-transitory computer-readable medium described herein, transmitting the control signal comprises multicasting the control signal to a plurality of user equipment (UE) configured to monitor the first CC for the PDCCH message beginning at a first determinative time after receipt of the control signal, and monitor the second CC a second determinative time after receipt of the control signal, and the first determinative time comprises a number of TTIs of the first CC and second determinative time comprises a number of TTIs of the second CC. Additionally or alternatively, in some examples a duration of TTIs of the first CC are different from a duration of TTIs of the second CC, and wherein the PDCCH message is transmitted in a TTI of the first CC and assigns a TTI of the second CC that at least partially overlaps in time with the TTI of the first CC.

In some examples of the method, apparatuses, or non-transitory computer-readable medium described herein, transmitting the control signal comprises multicasting the control signal to a plurality of user equipment (UE) configured to monitor the first CC for the PDCCH message beginning at a first determinative time after receiving the control signal, and monitor the second CC for a data channel in response to receiving the PDCCH message. Additionally or alternatively, in some examples the control signal comprises a physical channel.

In some examples of the method, apparatuses, or non-transitory computer-readable medium described herein, the control signal comprises a subband of the bandwidth of the first CC. Additionally or alternatively, in some examples the physical channel comprises a PDCCH format for UEs configured to monitor the second CC upon receipt of the control signal.

In some examples of the method, apparatuses, or non-transitory computer-readable medium described herein, the first CC comprises a PCC and the second CC comprises an eCC.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The disclosure may be understood by reference to the following drawings.

DETAILED DESCRIPTION

One component carrier (CC) of a carrier aggregation (CA) configuration may provide information about channel availability of another CC operating on a shared frequency resource in order to accommodate fast carrier activation. Aspects of the disclosure, including examples of fast enhanced CC (eCC) activation, are described in the context of a wireless communication system. In some examples, a primary CC, or PCell, may signal to a user equipment (UE) to activate an enhanced CC; and this activation may occur before or after a clear channel assessment (CCA) (e.g., before or after CCA is cleared). Fast eCC activation may be employed in both self-scheduling and cross-carrier scheduling scenarios. For instance, a PCell may signal eCC activation for an eCC that is self-scheduled. Or, a PCell may both signal eCC activation and schedule eCC resources. In both scenarios, because eCC activation may be before or after a CCA, the described techniques may provide for faster or more efficient activation of the eCC than might otherwise occur—e.g., if the eCC were to operate in a standalone mode. Additionally, some of the described examples illustrate a physical channel for fast eCC activation. These and other aspects of the disclosure are illustrated by and described with reference to various system diagrams, apparatus diagrams, and flowcharts that relate to fast eCC activation.

Figure 1:
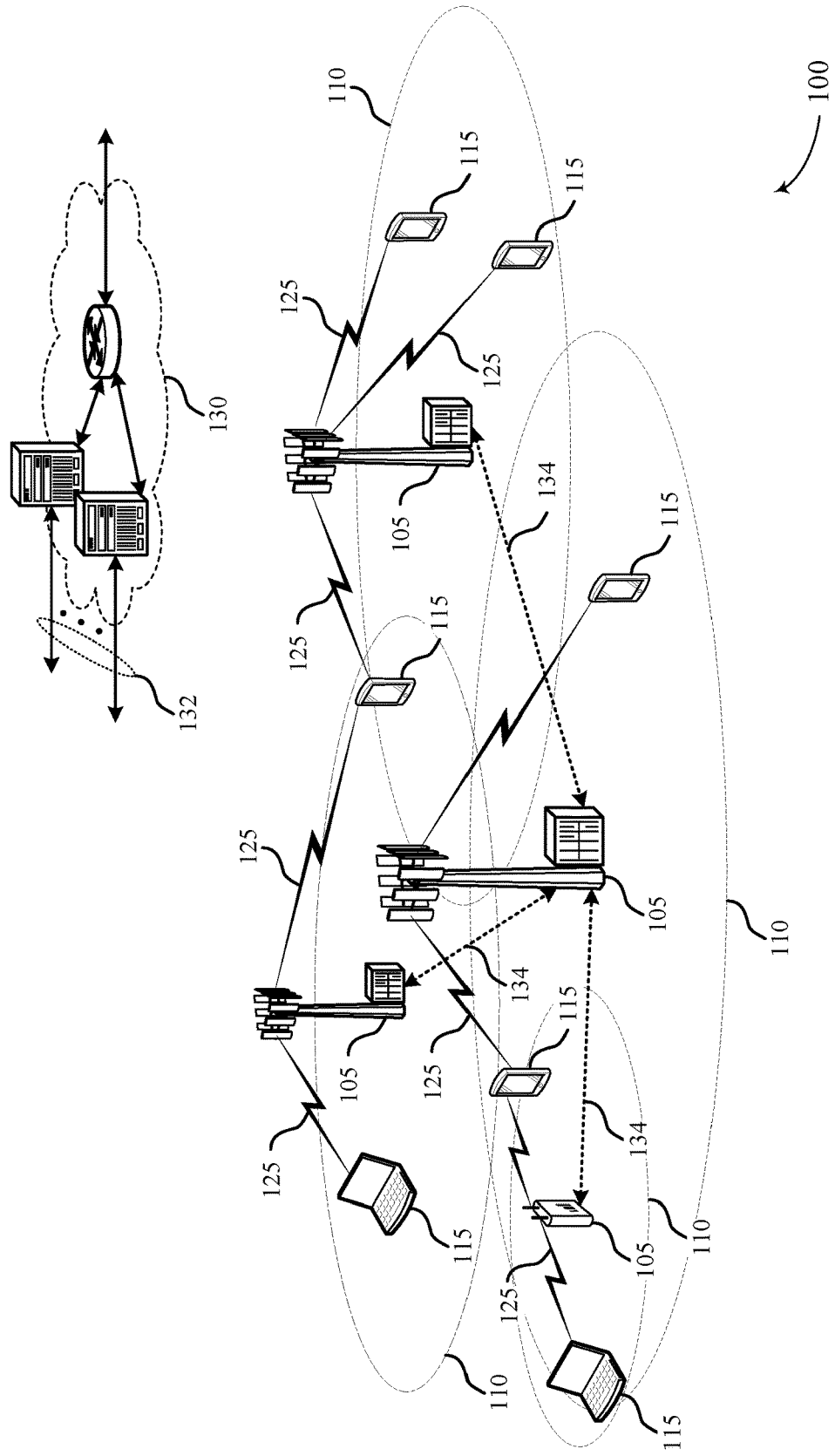
FIG. 1 illustrates an exemplary wireless communications system that supports fast enhanced component carrier (eCC) activation in accordance with various aspects of the present disclosure.

FIG. 1 illustrates an example of a wireless communications system 100 that supports DRX procedures with eCCs in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may support, and may communicate with one another to support DRX procedures with eCCs. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105, and may support fast eCC activation.

A UE may be configured with multiple carriers in a CA configuration, and the communication links 125 may represent such multicarrier CA configurations. A carrier may also be referred to as a CC, a layer, a channel, etc. The term "component carrier" may refer to each of the multiple carriers utilized by a UE in CA operation, and may be distinct from other portions of system bandwidth. For instance, a CC may be a relatively narrow-bandwidth carrier susceptible of being utilized independently or in combination with other CCs. Each CC may provide the same capabilities as an isolated carrier based on release 8 or release 9 of the LTE standard. Multiple CCs may be aggregated or utilized concurrently to provide some UEs 115 with greater bandwidth and, e.g., higher data rates. Thus, individual CCs may be backwards compatible with legacy UEs 115 (e.g., UEs 115 implementing LTE release 8 or release 9); while other UEs 115 (e.g., UEs 115 implementing post-release 8/9 LTE versions), may be configured with multiple CCs in a multi-carrier mode. A carrier used for DL may be referred to as a DL CC, and a carrier used for UL may be referred to as an UL CC. A UE 115 may be configured with multiple DL CCs and one or more UL CCs for CA. Each carrier may be used to transmit control information (e.g., reference signals, control channels, etc.), overhead information, data, etc.

A UE 115 may communicate with a single base station 105 utilizing multiple carriers, and may also communicate with multiple base stations simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). PCells may be semi-statically configured by higher layers (e.g., radio resource control (RRC), etc.) on a per-UE basis. Certain uplink control information (UCI), e.g., acknowledgement (ACK)/negative acknowledgment (NACK), channel quality indicator (CQI), and scheduling information transmitted on physical uplink control channel (PUCCH), may, in some cases, be carried only by the PCell. Additional carriers may be designated as secondary carriers, or secondary component carriers (SCC), which may be served by secondary cells (SCells). SCells may likewise be semi-statically configured on a per-UE basis. In some cases, SCells may not include or be configured to transmit the same control information as the PCells.

Wireless communications system 100 may also utilize one or more eCCs. An SCell may, for instance, be an eCC. An eCC may be characterized by one or more features including: flexible bandwidth, different transmission time intervals (TTIs), and modified control channel configuration. In some cases, an eCC may be associated with a CA configuration or a dual connectivity configuration (e.g., when multiple serving cells have a suboptimal backhaul link). An eCC characterized by flexible bandwidth may include one or more segments that may be utilized by UEs 115 that do are not capable of monitoring the whole bandwidth or prefer to use a limited bandwidth (e.g., to conserve power).

An eCC may also be configured for use in unlicensed spectrum or shared spectrum (e.g., where more than one operator is licensed to use the spectrum). Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5 G band. By contrast, the term "licensed spectrum" or "cellular spectrum" may be used herein to refer to wireless spectrum utilized by wireless network operators under administrative license from a governing agency or authority having jurisdiction. Various UEs 115 and base stations 105 may contend with devices of other systems for eCC resources on unlicensed or shared spectrum. For instance, without a fast eCC activation mechanism, UEs 115, may have to listen to channels of unlicensed spectrum in order to determine if a base station 105 has secured the channel. This indiscriminate listening may cause the UE 115 to expend power and devote hardware (e.g., antennas) unnecessarily, because a channel may not become available. Accordingly, and as described further below, fast eCC activation may help conserve UE 115 resources by monitoring an eCC when the eCC is likely to be used by the UE 115.

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic TDD operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexed (FDM) scheduling to accommodate flexible bandwidth use. Other control channel modifications include the use of additional control channels (e.g., for eMBMS scheduling, or to indicate the length of variable length UL and DL bursts), or control channels transmitted at different intervals. An eCC may also include modified or additional hybrid automatic repeat request (HARM) related control information.

The system 100 may employ eCCs in a stand-alone mode, in which UEs 115 may check reference points (e.g., designated downlink (DL) symbols) to detect the presence of serving base station on an eCC. That is, in some cases, the UE 115 may have to monitor the eCC to determine channel availability, as mentioned above. Alternatively, the system 100 may employ eCCs in non-standalone mode to support fast eCC activation. In such scenarios, a base station 105, via a PCell, may provide a UE with information about channel availability on the eCC. In some cases, the information may be associated with CCA clearance; for example, a base station 105 may send a channel availability indication after clearing CCA or if the base station 105 is likely to clear CCA. As described below, resources of an eCC may or may not be scheduled from a PCell, and a PCell may provide a channel availability indication to support fast eCC activation in either case. This fast eCC activation may allow a UE 115 to avoid continuous or non-strategic monitoring of the eCC.

Figure 2:
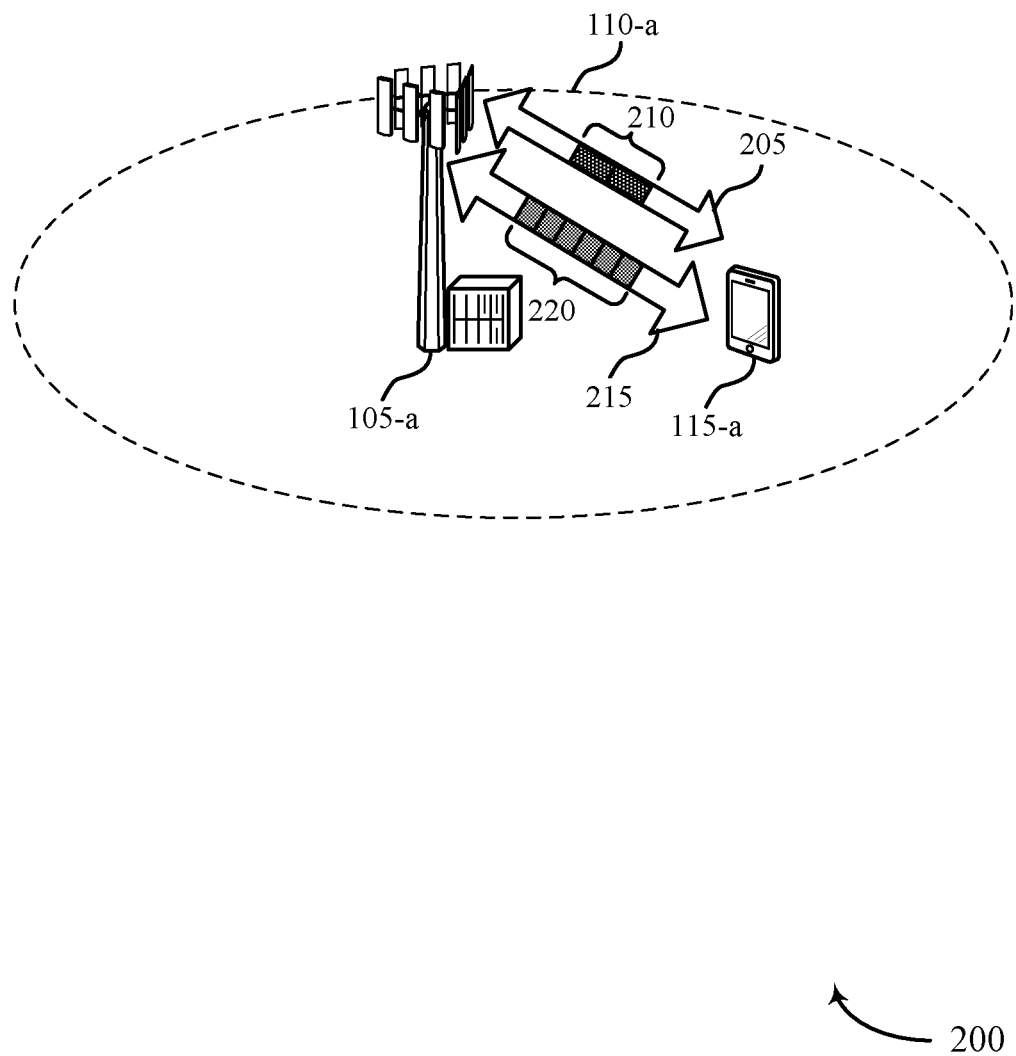
FIG. 2 illustrates an exemplary wireless communications system that supports fast eCC activation in accordance with various aspects of the present disclosure.

FIG. 2 illustrates an example of a wireless communications system 200 that supports fast eCC activation in accordance with various aspects of the present disclosure. The system 200 may employ eCCs in a non-standalone mode. For instance, a PCell that utilizes licensed frequency bandwidth may provide information about channel availability of an eCC that utilizes unlicensed frequency bandwidth. Although embodiments of the present disclosure discuss a PCell which utilizes licensed frequency bandwidth and an eCC (or SCell) which utilizes unlicensed frequency bandwidth, it is to be understood by one of skill in the art that the PCell and eCC may utilize either licensed or unlicensed frequency bandwidth. For example, both the PCell and the eCC (or SCell) may utilize unlicensed frequency bandwidth. Wireless communications system 200 may be an example of system 100 of FIG. 1, and it may include a UE 115-a, and base stations 105-a, which may each be an example of a UEs 115 and base stations 105 described herein, and with reference to FIG. 1.

UE 115-a may be within coverage area 110-a of base station 105-a. UE 115-a may have a CA configuration that includes PCell 205, having PCell TTIs 210, and eCC SCell 215, having eCC SCell TTIs 220. Base station 105-a may exchange data and control information with UE 105-a via CCs such as PCell 205 and an eCC SCell 215. In some cases, eCC SCell TTIs 220 may be of shorter duration than those associated with PCell TTIs 210. UE 115-a may receive information from base station 105-a in downlink eCC SCell TTIs 220 and downlink PCell TTIs 210. UE 115-a may send information to base station 105-a in uplink eCC SCell TTIs 220 and uplink PCell TTIs 210. Uplink eCC SCell TTIs 220 and uplink PCell TTIs 210 may be scheduled and transmitted asynchronously (e.g., the TTI boundaries may not be aligned). A group of contiguous eCC SCell 210, or PCell 205, TTIs may be called a burst.

The system 200 that may operate according to a layered protocol stack. A radio link control (RLC) layer may perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115-a and the base stations 105-a. The UE 115-a may be configured with PCell 205 and eCC 215 via RRC signaling.

Data may be divided into logical channels, transport channels, and physical layer channels. Channels may also be classified into Control Channels and Traffic Channels. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data.

The UE 115-a may receive a control signal on PCell 205 that is indicative of a channel availability on eCC SCell 215. In some cases, the indication may be a physical channel, which may be used in addition to the DL physical channels describe above. For instance, base station 105-a may employ a common physical channel that may be broadcast or groupcast to a number of UEs 115 for fast eCC activation. The base station 105-a may thus indicate channel availability of eCC SCell 215 to a number of UEs 115, including UE 115-a, using a physical channel of PCell 205. For a broadcast channel availability indication, a channel availability indication may be FDM over the duration of a PCell TTI 210. For instance, the channel availability indication may be FDM within a 5 MHz block of a PCell TTI 210, and may thus not be distributed over the entire bandwidth of PCell 205 (e.g., PCell 205 may have a 20 MHz bandwidth). For a groupcast channel availability indication, a ultra-low latency PDCCH (uPDCCH) format may be employed. This uPDCCH format may indication channel availability for a single eCC, such as eCC SCell 215, or for multiple eCCs. In some cases, a channel availability indication may be referred to as fast eCC activation, or fast activation, and may be indicated on a per-symbol or per-subframe basis.

As mentioned, eCC SCell 215 may utilize shared or unlicensed frequency spectrum (e.g., bandwidth). The base station 105-a or UE 115-a, or both, may perform a CCA of eCC SCell 215 in order to determine whether the channel is available. A CCA may include an energy detection procedure to determine whether there are any other active transmissions. For example, the device may infer that a change in a received signal strength indicates that a channel is occupied. Specifically, signal power that is concentrated in a certain bandwidth and exceeds a predetermined noise floor may indicate another wireless transmitter it using a channel. A CCA may also include detection of specific sequences that indicate use of the channel. For example, another device may transmit a specific preamble prior to transmitting a data sequence. As described below, the base station 105-a may send a channel availability indication to UE 115-a on PCell 205 before or after a CCA (e.g., before or after CCA is cleared).

Figure 3A:
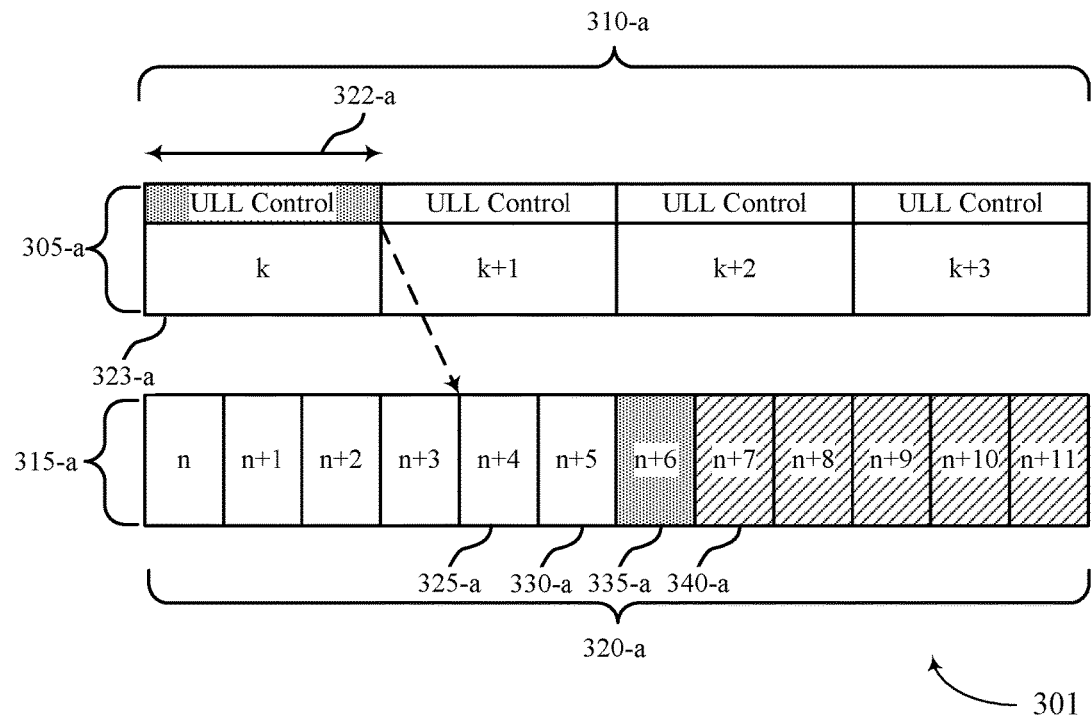
FIGS. 3A and 3B illustrate examples of signaling for self-scheduled eCCs in systems that support fast eCC activation in accordance with various aspects of the present disclosure.
Figure 3B:
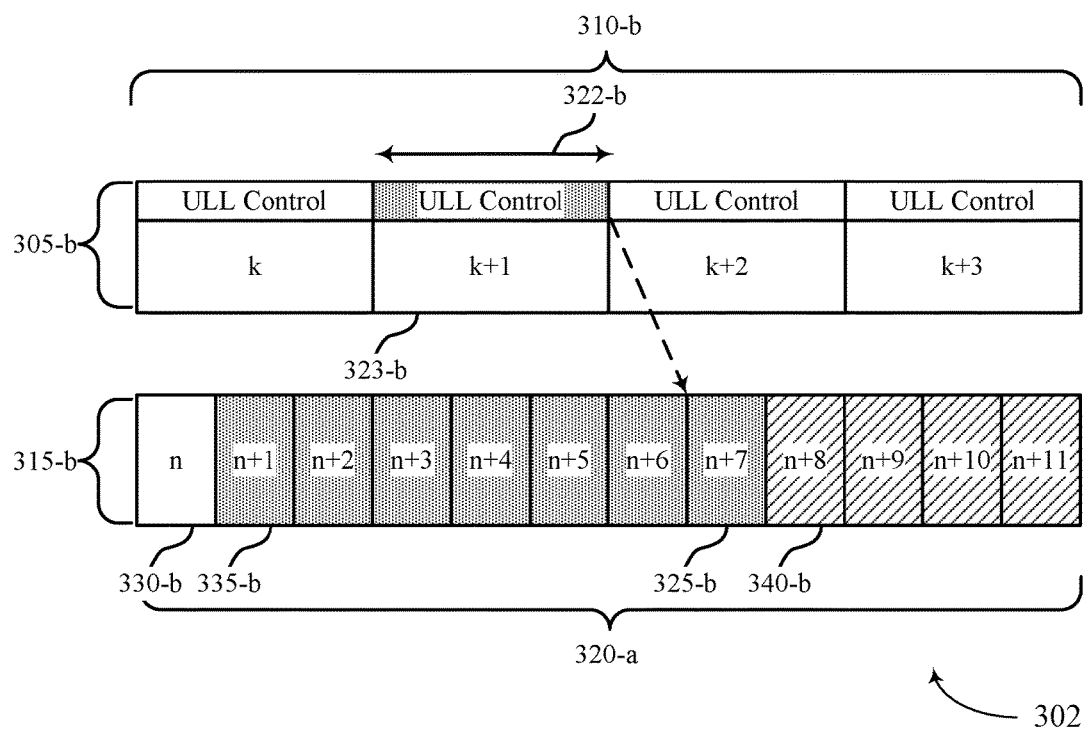

FIGS. 3A and 3B illustrate examples of signaling for self-scheduled eCCs in systems, including systems 100 and 200 of FIGS. 1 and 2, that support fast eCC activation in accordance with various aspects of the present disclosure. In the example of FIG. 3A, a CA configuration 301 includes a PCell 305-a—which may be an example of PCell 205 of FIG. 2—that may be used to indicate channel availability of an eCC SCell 315-a, which may be an example of eCC SCell 215 of FIG. 2. The eCC SCell 315-a may be self-scheduled (e.g., cross-carrier scheduling may not be employed). PCell 305-a may have PCell TTIs 310-a, which may be based on LTE numerology—e.g., each of the PCell TTIs 310-a may be 1 ms—or may have a different, lower latency numerology. PCell TTIs 310-a may be ULL TTIs, and may carry control and data channels referred to as ULL control or ULL data. For instance, each of the PCell TTIs 310-a may have a duration of less than 1 ms. The eCC SCell TTIs 320-a may each have a duration that is less than the duration of the PCell TTIs 310-a. For example, three (3) eCC SCell TTIs 320-a may have a duration equal to one (1) PCell TTI. A base station 105 may provide a fast channel activation 322-a during one of the PCell TTIs. The fast activation 322-a may indicate to a UE 115 that it should monitor eCC SCell 315-a. The fast activation 322-a may be FDM within a PCell TTI, such that the fast activation 322-a is for the duration of the PCell TTI 323-a, but may not occupy the entire bandwidth of the PCell 305-a.

A UE 115 may receive the fast activation 322-a in PCell TTI k 323-a, and may begin monitoring the eCC SCell 315-a for control and data transmissions in eCC SCell TTI n+4 325-a. In the example of FIG. 3A, CCA may be cleared in eCC SCell TTI n+5 330-a and the UE 115 may receive a preamble transmission from the base station 105 in eCC SCell TTI n+6 335-a. The UE 115 may then receive a control or data transmission (e.g., PDCCH or PDSCH) on eCC SCell from the base station 105 in eCC SCell TTI n+7 340-a.

In the example of FIG. 3B, a CA configuration 302 includes a PCell 305-b—which may be an example of PCell 205 of FIG. 2—that may be used to indicate channel availability of an eCC SCell 315-b—which may be an example of eCC SCell 215 of FIG. 2. The eCC SCell 315-b may be self-scheduled (e.g., cross-carrier scheduling may not be employed). PCell 305-b may have PCell TTIs 310-b, which may be based on LTE numerology or may have a different, lower latency numerology. PCell TTIs 310-b may be ULL TTIs, and may carry control and data channels referred to as ULL control or ULL data. Each of the PCell TTIs 310-b may, for instance, have a duration of less than 1 ms. The eCC SCell TTIs 320-b may each have a duration that is less than the duration of the PCell TTIs 310-b. For example, three (3) eCC SCell TTIs 320-b may have a duration equal to one (1) PCell TTI. A base station 105 may provide a fast channel activation 322-b during one of the PCell TTIs k+1 323-b. The fast activation 322-b may indicate to a UE 115 that it should monitor eCC SCell 315-b. The fast activation 322-b may be FDM within a PCell TTI, such that the fast activation 322-b is for the duration of the PCell TTI 323-b, and may not occupy the entire bandwidth of the PCell 305-b.

A UE 115 may receive the fast activation 322-b in PCell TTI k+1 323-b, and may begin monitoring the eCC SCell 315-a for control and data transmissions in eCC SCell TTI n+7 325-b. In the example of FIG. 3A, CCA may be cleared in eCC SCell TTI n 330-b, base station 105 may be transmitting channel usage beacons or preambles beginning in eCC SCell TTI n+1 335-b; and the UE 115 may thus receive a preamble transmission from the base station 105 in eCC SCell TTI n+7 325-b upon initiating monitoring of eCC SCell 315-b. The UE 115 may then receive a control or data transmission (e.g., PDCCH or PDSCH) on eCC SCell from the base station 105 in eCC SCell TTI n+8 340-b.

In some cases, UE 115 may initiate a timer, which may be referred to as a monitoring timer, upon receiving a fast channel activation 322. In such cases, if UE 115 does not detect a preamble from a base station 105 on the eCC SCell 315 before the timer expires, UE 115 may cease monitoring the eCC SCell 315. But if the UE 115 receives a preamble from the base station 105 before expiry of the timer, UE 115 may restart the timer and continue monitoring. This time-limited monitoring may help a UE 115 from unnecessarily expending resources for a channel that has not been cleared by the base station 105.

Figure 4A:
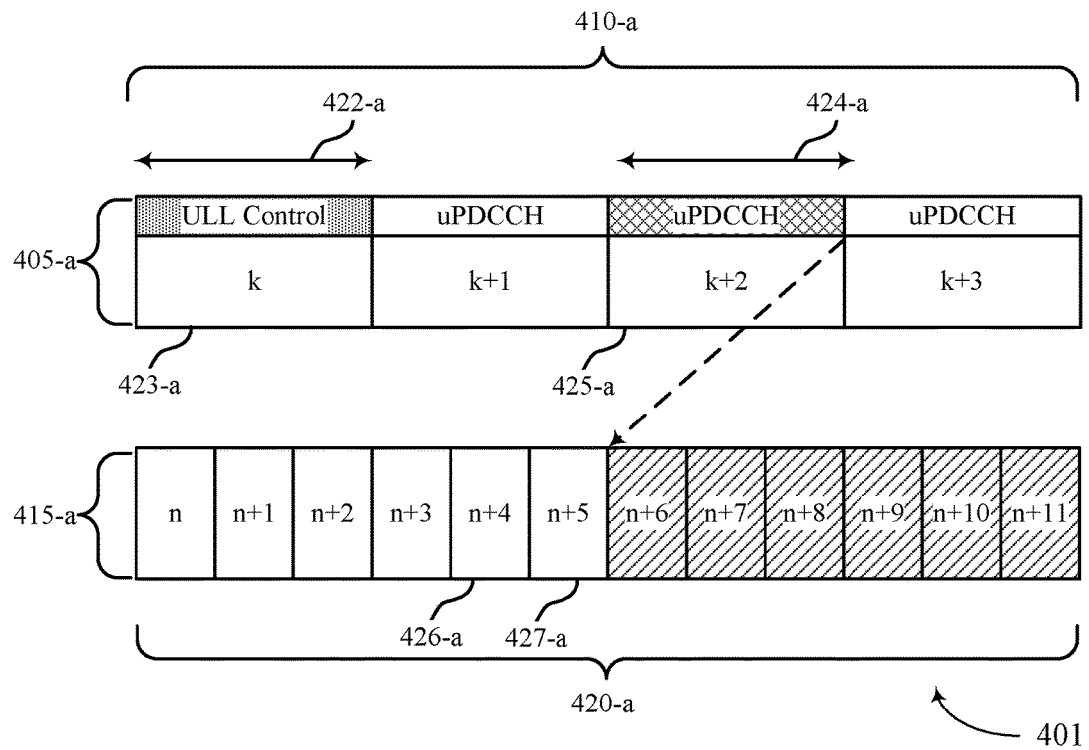
FIGS. 4A, 4B, 5A, and 5B illustrate examples of signaling for cross carrier-scheduled eCCs in systems that support fast eCC activation in accordance with various aspects of the present disclosure.
Figure 4B:
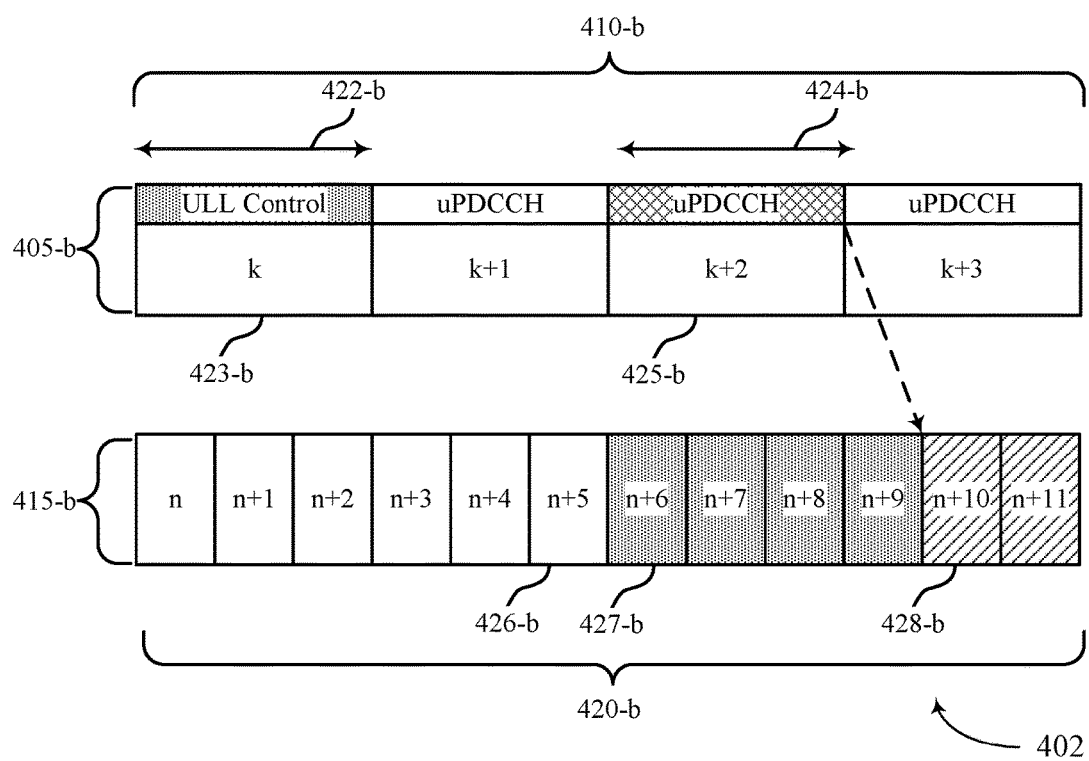

FIGS. 4A and 4B illustrate examples of signaling for cross carrier-scheduled eCCs in systems, including systems 100 and 200 of FIGS. 1 and 2, that support fast eCC activation in accordance with various aspects of the present disclosure. In the example of FIG. 4A, a CA configuration 401 includes a PCell 405-a—which may be an example of PCell 205 of FIG. 2—that may be used to indicate channel availability of an eCC SCell 415-a, which may be an example of eCC SCell 215 of FIG. 2. In the examples of FIGS. 4A and 4B, a UE 115 may receive a fast eCC activation (e.g., channel availability indication) from PCell 405-a before CCA is cleared. Accordingly, both fast eCC activation and eCC scheduling may be indicated by or transmitted on the PCell 405-a, but eCC fast activation may occur, then CCA, and then a grant of eCC resources.

PCell 405-a may have PCell TTIs 410-a, which may be based on LTE numerology—e.g., each of the PCell TTIs 410-a may be 1 ms—or may have a different, lower latency numerology. PCell TTIs 410-a may be ULL TTIs, and may carry control and data channels referred to as ULL control or ULL data. For instance, each of the PCell TTIs 410-a may have a duration of less than 1 ms. The eCC SCell TTIs 420-a may each have a duration that is less than the duration of the PCell TTIs 410-a. For instance, three (3) eCC SCell TTIs 420-a may have a duration equal to one (1) PCell TTI. A base station 105 may provide a fast channel activation 422-a during one of the PCell TTIs k 423-a. The fast activation 422-a may indicate to a UE 115 that it should monitor eCC SCell 415-a. In some cases, the fast activation 422-a that the UE 115 should monitor eCC SCell 415-a at some time after receiving the fast activation 422-a; this time may be signaled or determinative. The fast activation 422-a may be FDM within a PCell TTI, such that the fast activation 422-a is for the duration of the PCell TTI k 423-a, but may not occupy the entire bandwidth of the PCell 405-a. The base station 105 may also transmit a PDCCH message (e.g., uPDCCH) 424-a in PCell TTI k+2 425-a, which may schedule resources of eCC SCell 415-a.

A UE 115 may receive the fast activation 422-a in PCell TTI k 423-a, and may begin monitoring the eCC SCell 415-a for CCA in eCC SCell TTI n+4 426-a. The time between receiving fast activation 422-a and monitoring eCC SCell 415-a may be a determinative time equal to four (4) eCC SCell TTIs. In the example of FIG. 4A, CCA may be cleared in eCC SCell TTI n+5 427-a. The UE 115 may then receive a control or data transmission (e.g., PDSCH) on eCC SCell 415-a from the base station 105 as scheduled by the PDCCH message. As depicted, PCell 405-a may assign resources of eCC SCell 415-a with eCC SCell TTIs that overlap the PCell TTI k+2 425-a carrying the grant. In other words, when eCC fast activation is indicated before CCA is cleared, a cross-carrier grant my assign resources for over-lapping eCC SCell TTIs. In such cases, UE 115 may start monitoring uPDCCH for a grant at some time after receiving the fast eCC activation; this may be a determinative time (e.g., two (2) PCell TTIs).

In some examples, a cross-carrier grant on a PCell may assign resources for future eCC SCell TTIs. In the example of FIG. 4B, a CA configuration 402 includes a PCell 405-b—which may be an example of PCell 205 of FIG. 2—that may be used to indicate channel availability of an eCC SCell 415-b, which may be an example of eCC SCell 215 of FIG. 2. PCell 405-b may have PCell TTIs 410-b, which may be based on LTE numerology or may have a different, lower latency numerology. PCell TTIs 410-b may be ULL TTIs, and may carry control and data channels referred to as ULL control or ULL data. Each of the PCell TTIs 410-b may, for example, have a duration of less than 1 ms. The eCC SCell TTIs 420-b may each have a duration that is less than the duration of the PCell TTIs 410-b. For instance, three (3) eCC SCell TTIs 420-b may have a duration equal to one (1) PCell TTI. A base station 105 may provide a fast channel activation 422-b during one of the PCell TTIs k 423-a. The fast activation 422-b may indicate to a UE 115 that it should monitor eCC SCell 415-b. In some cases, the fast activation 422-b indicates that the UE 115 should monitor eCC SCell 415-b at some time after receiving the fast activation 422-b. The fast activation 422-b may be FDM within a PCell TTI, such that the fast activation 422-b is for the duration of the PCell TTI k 423-b. The base station 105 may also transmit a PDCCH message (e.g., uPDCCH) 424-b in PCell TTI k+2 425-a, which may schedule resources of eCC SCell 415-b.

A UE 115 may receive the fast activation 422-b in PCell TTI k 423-b, and may begin monitoring the eCC SCell 415-*b* for control and data transmissions only after CCA is cleared in eCC SCell TTI n+5 426-*b*. Base station 105 may then receive channel usage beacons or preambles in eCC SCell TTI n+6 427-*b*, and, in some cases, in subsequent eCC SCell TTIs. The UE 115 may receive a PDCCH message 424-*b* in PCell TTI k+2 425-*b*, which may schedule eCC SCell resources beginning in eCC SCell TTI n+10 428-*b*. The UE 115 may begin monitoring eCC SCell 415-*b* and may receive data, if scheduled, in eCC SCell TTI n+10 428-*b*. In other words, PDCCH message 424-*b* may schedule resources of eCC SCell 415-*b* that do not overlap in time.

Figure 5A:
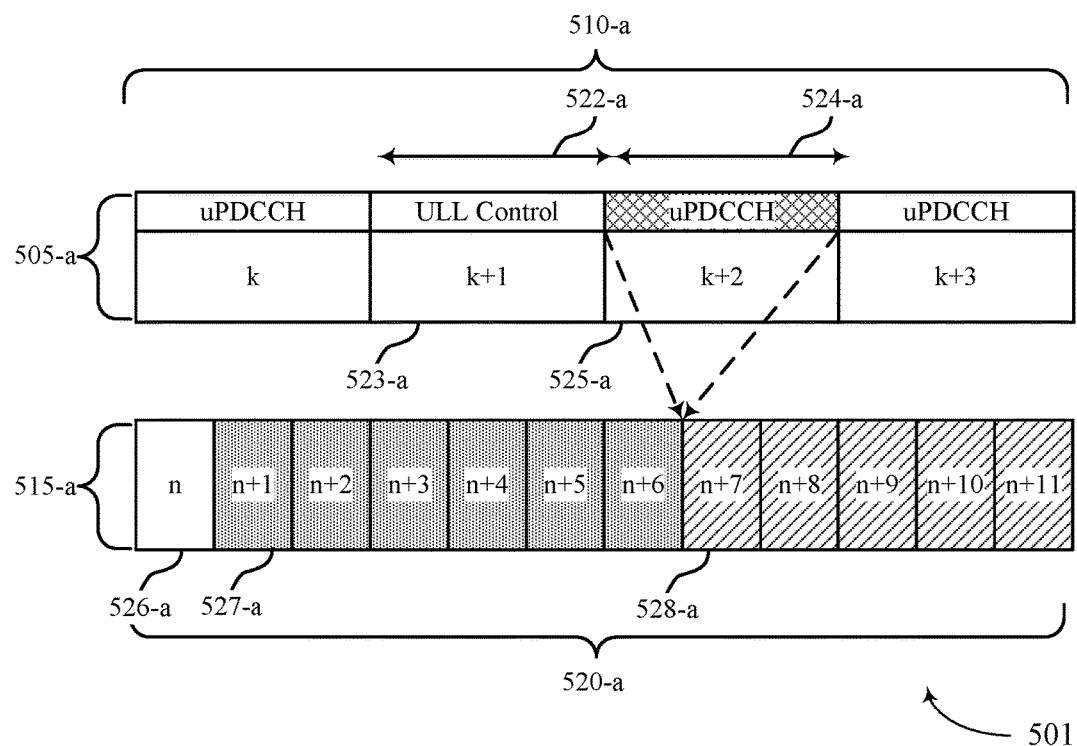
Figure 5B:
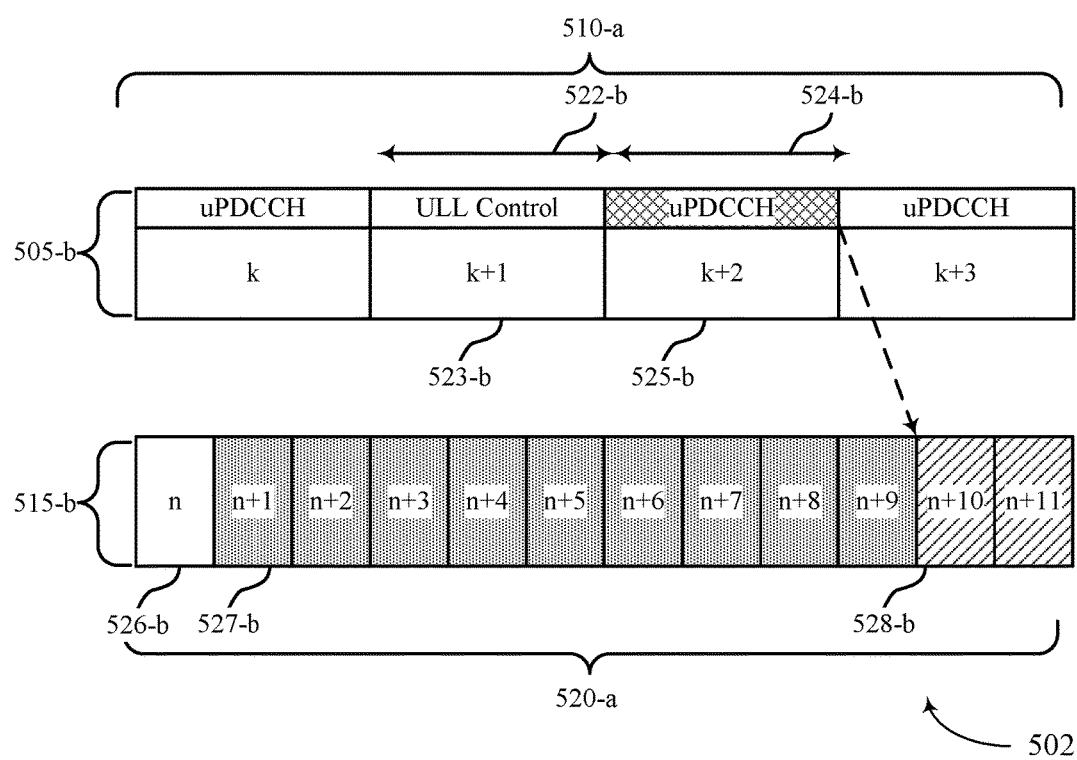

FIGS. 5A and 5B illustrate examples of signaling for cross carrier-scheduled eCCs in systems, including systems 100 and 200 of FIGS. 1 and 2, that support fast eCC activation in accordance with various aspects of the present disclosure. In the example of FIG. 5A, a CA configuration 501 includes a PCell 505-*a*—which may be an example of PCell 205 of FIG. 2—that may be used to indicate channel availability of an eCC SCell 515-*a*, which may be an example of eCC SCell 215 of FIG. 2. In the examples of FIGS. 5A and 5B, a UE 115 may receive a fast eCC activation (e.g., channel availability indication) from PCell 505-*a* after CCA is cleared. Accordingly, both fast eCC activation and eCC scheduling may be indicated by or transmitted on the PCell 505-*a*, and CCA may be cleared, then eCC fast activation may occur, and then a grant of eCC resources.

PCell 505-*a* may have PCell TTIs 510-*a*, which may be based on LTE numerology—e.g., each of the PCell TTIs 510-*a* may be 1 ms—or may have a different, lower latency numerology. PCell TTIs 510-*a* may be ULL TTIs, and may carry control and data channels referred to as ULL control or ULL data. For instance, each of the PCell TTIs 510-*a* may have a duration of less than 1 ms. The eCC SCell TTIs 520-*a* may each have a duration that is less than the duration of the PCell TTIs 510-*a*. For instance, three (3) eCC SCell TTIs 520-*a* may have a duration equal to one (1) PCell TTI. A base station 105 may provide a fast channel activation 522-*a* during one of the PCell TTIs k+1 523-*a*. The fast activation 522-*a* may indicate to a UE 115 that it should monitor eCC SCell 515-*a*. In some cases, the fast activation 522-*a* that the UE 115 should monitor eCC SCell 515-*a* at some time after receiving the fast activation 422-*a*; this time may be signaled or determinative. For instance, UE 115 may monitor eCC SCell 515-*a* n+4 eCC SCell TTIs after receiving the fast activation 522-*a*. The fast activation 522-*a* may be FDM within a PCell TTI, such that the fast activation 522-*a* is for the duration of the PCell TTI k+1 523-*a*, but may not occupy the entire bandwidth of the PCell 505-*a*. The base station 105 may also transmit a PDCCH message (e.g., uPDCCH) 524-*a* in PCell TTI k+2 525-*a*, which may schedule resources of eCC SCell 515-*a*. The UE 115 may begin monitoring for a PDCCH message upon receiving the fast activation 522-*a*.

A UE 115 may receive the fast activation 522-*a* in PCell TTI k+1 523-*a*. CCA may be cleared in eCC SCell TTI n 526-*a*; and base station 105 may transmit channel usage beacons beginning in eCC SCell TTI n+1 527-*a*. The UE 115 may receive data (e.g., PDSCH) in eCC SCell TTI n+7 528-*a*, as assigned by PDCCH message 524-*a*, and during the TTI in which UE 115 begins monitoring eCC SCell 515-*a* according to the determinative time after receiving the fast activation 522-*a*. In the example of FIG. 5A, PCell 505-*a* may schedule resources of eCC SCell 515-*a* such that the scheduled resources overlap in time with PDCCH message 524-*a*.

In the example of FIG. 5B, PCell 505-*b* may schedule future, non-overlapping resources of eCC SCell 515-*b*. FIG. 5Ba includes a CA configuration 502, which, in turn, includes a PCell 505-*b*—which may be an example of PCell 205 of FIG. 2—that may be used to indicate channel availability of an eCC SCell 515-*b*, which may be an example of eCC SCell 215 of FIG. 2. PCell 505-*b* may have PCell TTIs 510-*b*, which may be based on LTE numerology or may have a different, lower latency numerology. PCell TTIs 510-*b* may be ULL TTIs, and may carry control and data channels referred to as ULL control or ULL data. For instance, each of the PCell TTIs 510-*b* may have a duration of less than 1 ms. The eCC SCell TTIs 520-*b* may each have a duration that is less than the duration of the PCell TTIs 510-*a*. For example, three (3) eCC SCell TTIs 520-*b* may have a duration equal to one (1) PCell TTI. A base station 105 may provide a fast channel activation 522-*b* during one of the PCell TTIs k+1 523-*b*.

The fast activation 522-*b* may indicate to a UE 115 that it should monitor eCC SCell 515-*b*; for example, the UE 115 may begin monitoring eCC SCell 515-*b* when UE 115 is scheduled resources on eCC SCell 515-*b*. For instance, UE 115 may after receiving the fast activation 522-*a* and after receiving PDCCH message 524-*b* in PCell TTI k+2. The fast activation 522-*a* may be FDM within a PCell TTI, such that the fast activation 522-*a* is for the duration of the PCell TTI k+1 523-*a*, but may not occupy the entire bandwidth of the PCell 505-*a*. The UE 115 may begin monitoring for PDCCH message 524-*b* upon receiving the fast activation 522-*a*. CCA may be cleared in eCC SCell TTI n 526-*b*; and base station 105 may transmit channel usage beacons beginning in eCC SCell TTI n+1 527-*b*. The UE 115 may receive data (e.g., PDSCH) in eCC SCell TTI n+7 528-*b*, as assigned by PDCCH message 524-*b*.

In the case where fast eCC activation is indicated after CCA is cleared, as illustrated in FIGS. 3B, 5A, and 5B, the actual data transmission may be delayed as compared with fast eCC activation before CCA is cleared, as illustrated in FIGS. 3A, 4A, and 4B. There may be a tradeoff in monitoring and resources: fast eCC activation after CCA may allow a UE 115 to preserve resources (e.g., battery power, time, etc.) necessary for monitoring an eCC, but may cause a greater delay between CCA and communicating on the eCC than fast eCC activation before monitoring. Systems that support fast eCC activation, like systems 100 and 200 of FIGS. 1 and 2, may thus achieve different ends by employing the various examples described with reference to FIGS. 3A-5B.

Figure 6:
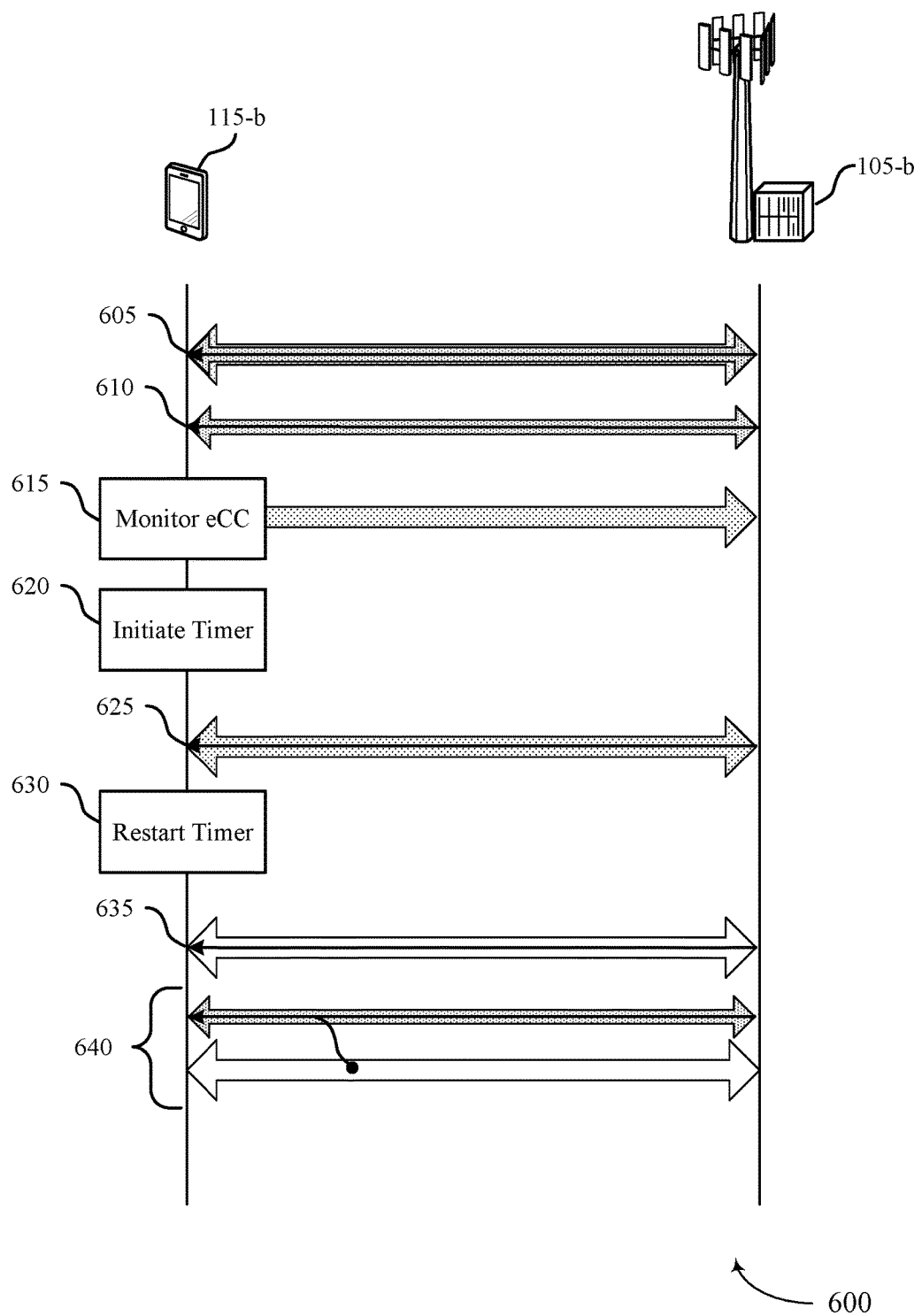
FIG. 6 illustrates an exemplary process flow for a system that supports fast eCC activation in accordance with various aspects of the present disclosure.

FIG. 6 illustrates an example of a process flow 600 for a system that supports fast eCC activation in accordance with various aspects of the present disclosure. Process flow 600 may include a UE 115-*b* and a base station 105-*b*, which may be an examples of UEs 115 and base stations 105 described herein, and with reference to FIGS. 1-5B. The UE 115-*b* may support CA with an eCC; and the base station 105-*b* may configure the UE 115-*a* for CA with an eCC.

At 605, base station 105-*b* may transmit and UE 115-*a* may receive signaling indicative of a CA configuration that includes a first CC that utilizes a licensed frequency bandwidth and a second CC that utilizes an unlicensed frequency bandwidth. In some examples the first CC is a PCC (e.g., PCell) and the second CC is an eCC (e.g., eCC SCell).

At 610, base station 105-*b* may transmit and UE 115-*b* may receive a control signal on the first CC indicative of a channel availability on the second CC. Transmitting the control signal may include multicasting the control signal to several UEs 115 configured to monitor the second CC upon receipt of the control signal. Alternatively, transmitting the control signal may include multicasting the control signal to several UEs 115 configured to monitor the first CC for the PDCCH message beginning at a first determinative time after receipt of the control signal, and to monitor the second CC a second determinative time after receipt of the control signal. In some cases, transmitting the control signal includes multicasting the control signal to several UEs 115 configured to monitor the first CC for the PDCCH message beginning at a first determinative time after receiving the control signal, and to monitor the second CC for a data channel in response to receiving the PDCCH message.

The base station 105-*b* may, in some cases, determine that a channel of the second CC is available for communication after transmitting the control signal. In some examples, base station 105-*b* may determine that a channel of the second CC is available for communication, and the control signal may be transmitted after the determination that the channel of the second CC is available. In some cases, base station 105-*b* may transmit a channel usage beacon on the second CC, which may assist base station 105-*b* in maintain the channel.

The control signal may be a physical channel, which may include a PDCCH format for UEs 115 configured to monitor the second CC upon receipt of the control signal. In some examples, the control signal may be sent on a subband of the bandwidth of the first CC.

In response to the received control signal, at 615, UE 115-*b* may monitor the second CC. In some examples, at 620, UE 115-*b* may initiate a monitoring timer based on the monitoring.

At 625, base station 105-*b* may transmit and UE 115-*b* may receive a preamble transmission on the second CC. In some examples, UE 115-*b* may, at 630, restart the monitoring timer in response to the received preamble transmission. In other examples, UE 115-*b* may determine that the monitoring timer has expired before a preamble transmission is received on the second CC, and UE 115-*b* may cease the monitoring of the second CC.

At 635, base station 105-*b* may transmit and UE 115-*b* may receive a PDCCH or PDSCH message on the second CC, and the PDCCH or PDSCH message schedules resources of the second CC.

Alternatively, at 640, base station 105-*b* may transmit and UE 115-*b* may receive a PDCCH message on the first CC, which may schedule resources of the second CC. In some examples, a duration of TTIs of the first CC are different from a duration of TTIs of the second CC, and the PDCCH message may be transmitted in a TTI of the first CC and assigns a TTI of the second CC that overlaps in time with the TTI of the first CC. The UE 115-*b* may, in some examples, monitor the first CC for the PDCCH message beginning at a first determinative time after receiving the control signal, and UE 115-*b* may monitor the second CC beginning at a second determinative time after receiving the control signal. In some examples, the first determinative time includes a number of TTIs of the first CC and second determinative time may include a number of TTIs of the second CC.

In some cases, a duration of TTIs of the first CC are different from a duration of TTIs of the second CC, and the PDCCH message is transmitted in a TTI of the first CC and assigns a TTI of the second CC that at least partially overlaps in time with a subsequent TTI of the first CC.

The UE 115-*b* may, in some cases, monitor the first CC for the PDCCH message beginning at a first determinative time after receiving the control signal; and UE 115-*b* may monitor the second CC for a data channel in response to receiving the PDCCH message.

Figure 7:
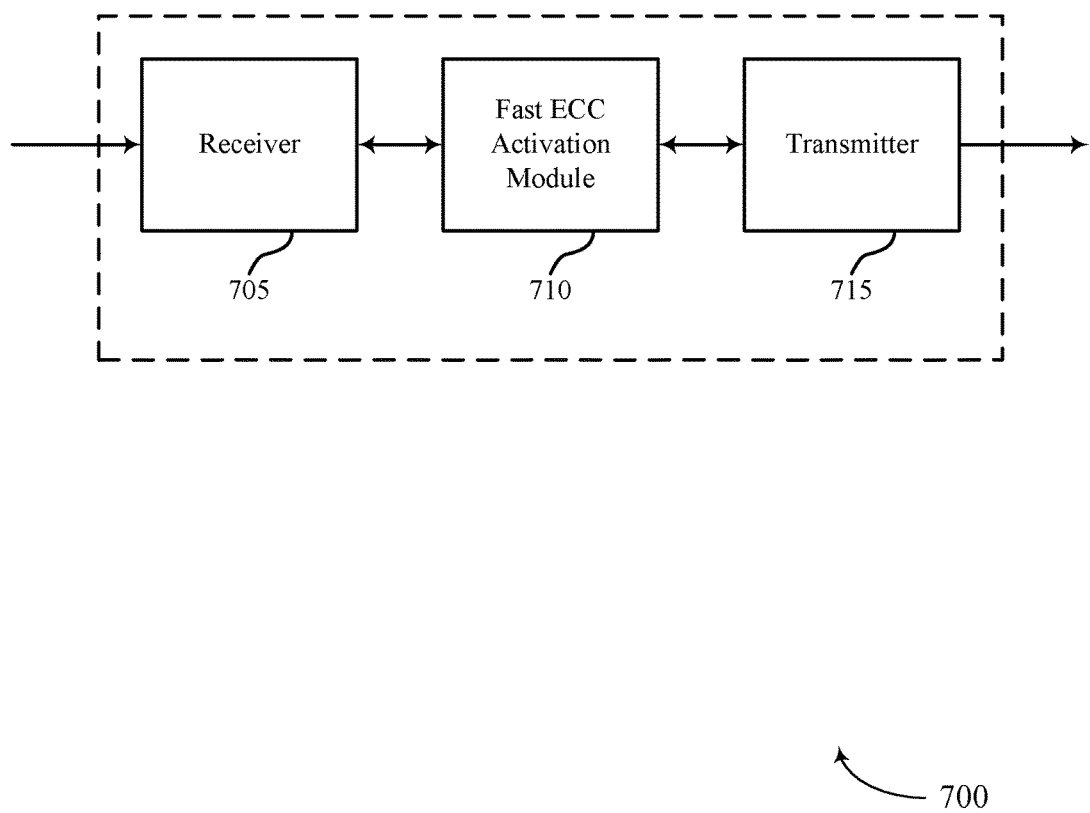
FIGS. 7-9 illustrate an exemplary wireless device or devices that support fast eCC activation in accordance with various aspects of the present disclosure.

Turning next to FIG. 7, an exemplary wireless device 700 that supports fast eCC activation in accordance with various aspects of the present disclosure is shown. Wireless device 700 may be an example of aspects of a UE 115 described with reference to FIGS. 1-6. Wireless device 700 may include a receiver 705, a fast eCC activation module 710, or a transmitter 715. Wireless device 700 may also include a processor. Each of these components may be in communication with one another.

The receiver 705 may receive information such as packets, user data, or control information associated with various information channels (e.g., control channels, data channels, and information related to fast eCC activation, etc.). Information may be passed on to the fast eCC activation module 710, and to other components of wireless device 700.

The fast eCC activation module 710 may, in combination with receiver 705, receive signaling indicative of a CA configuration that may include a first CC that utilizes a licensed frequency bandwidth and a second CC that utilizes an unlicensed frequency bandwidth. The fast eCC activation module 710 may also receive a control signal on the first CC indicative of a channel availability on the second CC.

The transmitter 715 may transmit signals received from other components of wireless device 700. In some examples, the transmitter 715 may be collocated with the receiver 705 in a transceiver module. The transmitter 715 may include a single antenna, or it may include a plurality of antennas.

Figure 8:
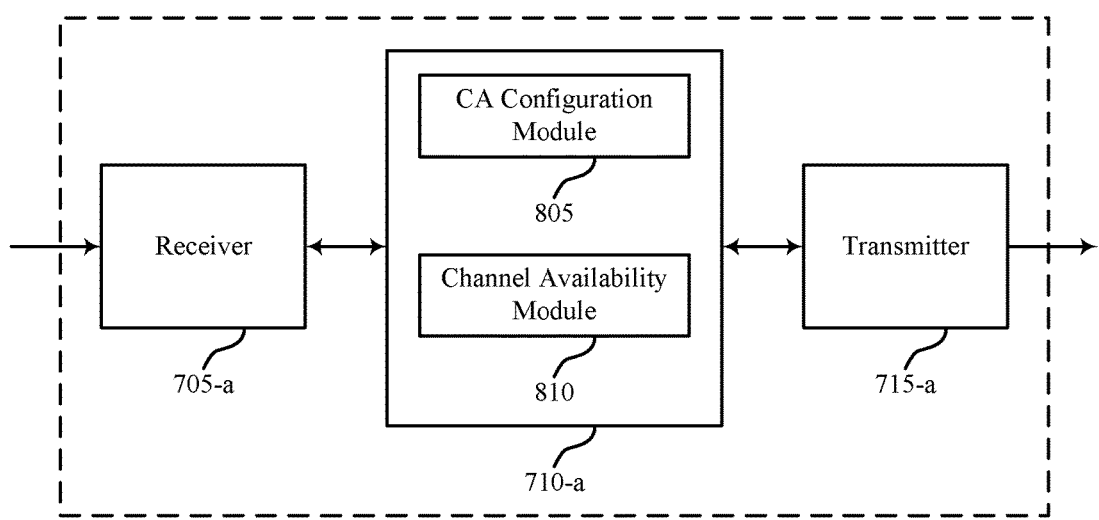

FIG. 8 shows exemplary wireless device 800 that supports fast eCC activation in accordance with various aspects of the present disclosure. Wireless device 800 may be an example of aspects of a wireless device 700 or a UE 115 described with reference to FIGS. 1-7. Wireless device 800 may include a receiver 705-*a*, a fast eCC activation module 710-*a*, or a transmitter 715-*a*. Wireless device 800 may also include a processor. Each of these components may be in communication with one another. The fast eCC activation module 710-*a* may also include a CA configuration module 805, and a channel availability module 810.

The receiver 705-*a* may receive information which may be passed on to fast eCC activation module 710-*a*, and to other components of the device 800. The fast eCC activation module 710-*a* may perform the operations described herein with reference to FIG. 7. The transmitter 715-*a* may transmit signals received from other components of wireless device 800.

The CA configuration module 805 may receive signaling indicative of a CA configuration, including a first CC that utilizes a licensed frequency bandwidth and a second CC that utilizes an unlicensed frequency bandwidth, as described herein with reference to FIGS. 2-6. In some examples, the first CC is a PCC and the second CC is an eCC.

The channel availability module 810 may receive a control signal on the first CC indicative of a channel availability on the second CC, as described herein with reference to FIGS. 2-6. In some examples, the control signal is a physical channel. Additionally or alternatively, the control signal may occupy a subband of the bandwidth of the first CC.

Figure 9:
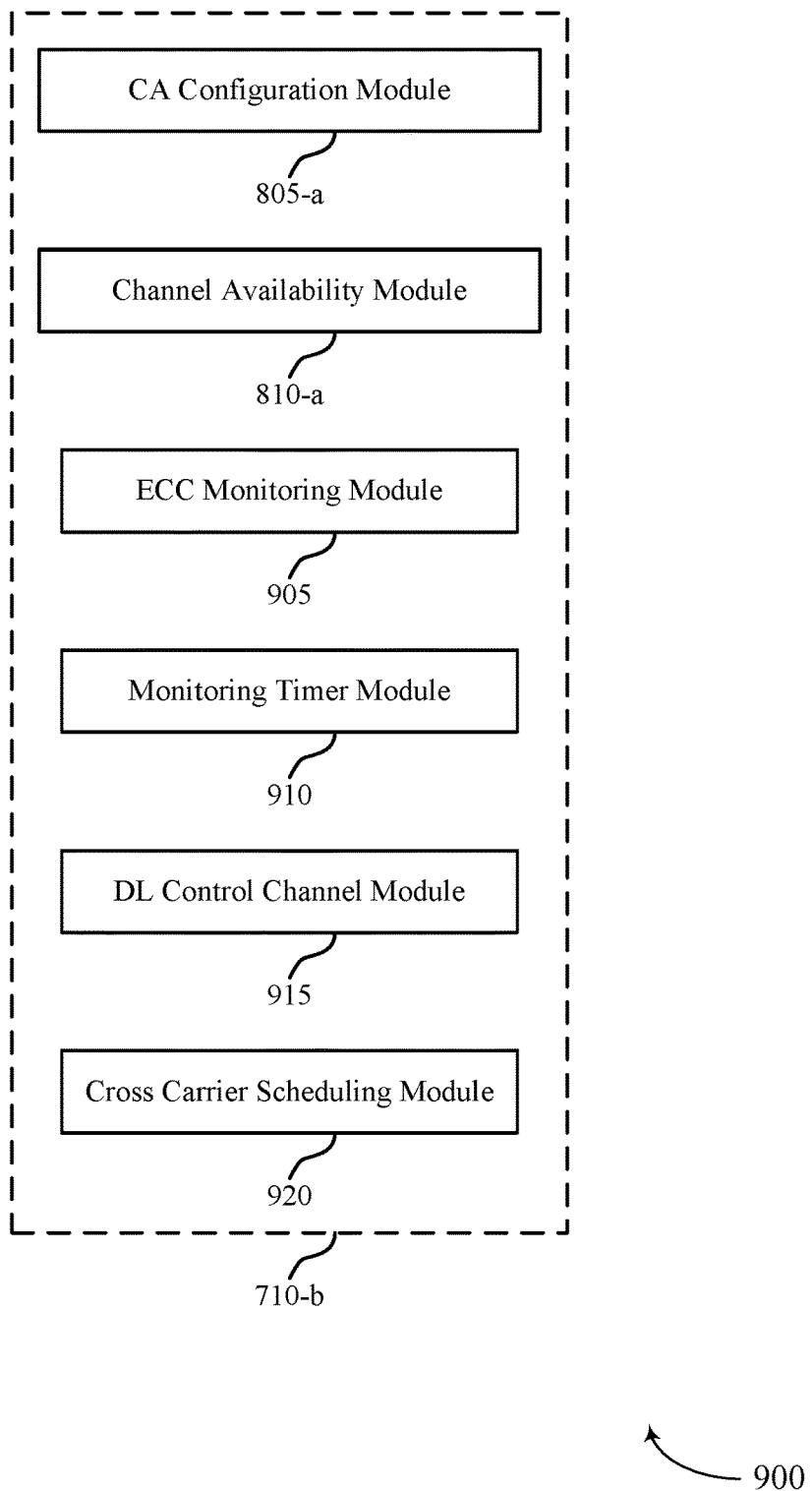

FIG. 9 shows a block diagram 900 of a fast eCC activation module 710-*b* which may be a component of a wireless device 700 or a wireless device 800 that supports fast eCC activation in accordance with various aspects of the present disclosure. The fast eCC activation module 710-*b* may be an example of aspects of a fast eCC activation module 710 described with reference to FIGS. 7-8. The fast eCC activation module 710-*b* may include a CA configuration module 805-*a*, and a channel availability module 810-*a*. Each of these modules may perform the functions described herein with reference to FIG. 8. The fast eCC activation module 710-*b* may also include an eCC monitoring module 905, a monitoring timer module 910, a DL control channel module 915, and a cross carrier scheduling module 920.

The eCC monitoring module 905 may monitor the second CC in response to the received control signal, as described herein with reference to FIGS. 2-6. The eCC monitoring module 905 may also receive a preamble transmission on the second CC. The eCC monitoring module 905 may, in some examples, cease the monitoring of the second CC on expiry of a monitoring timer. The eCC monitoring module 905 may, in some examples, monitor the second CC beginning at a second determinative time after the control signal is received. The eCC monitoring module 905 may monitor the second CC for a data channel in response to receiving the PDCCH message at, for example, device 700 or 800.

The monitoring timer module 910 may initiate a monitoring timer based on the monitoring, as described herein with reference to FIGS. 2-6. The monitoring timer module 910 may also restart the monitoring timer in response to the received preamble transmission. The monitoring timer module 910 may also determine that the monitoring timer has expired before a preamble transmission is received on the second CC, and may indicate as much to the monitoring module 905.

The DL control channel module 915 may receive a PDCCH or PDSCH message on the second CC; and the PDCCH or PDSCH message may schedule resources of the second CC, as described herein with reference to FIGS. 2-3B and 6. The DL control channel module 915 may, in some cases, receive a PDCCH message on the first CC, and the PDCCH message schedules resources of the second CC, as described herein with reference to FIGS. 2, 4A-5B, and 6. In some examples, a duration of TTIs of the first CC are different from a duration of TTIs of the second CC, and the PDCCH message may be transmitted in a TTI of the first CC and assign a TTI of the second CC that at least partially overlaps in time with the TTI of the first CC. In some examples, a duration of TTIs of the first CC are different from a duration of TTIs of the second CC, and the PDCCH message may be transmitted in a TTI of the first CC and assign a TTI of the second CC that overlaps in time with a subsequent TTI of the first CC.

The cross carrier scheduling module 920 may monitor the first CC for the PDCCH message beginning at a first determinative time after receiving the control signal as described herein with reference to FIGS. 2, 4A-5B, and 6. In some examples, the first determinative time may be a number of TTIs of the first CC and second determinative time may be a number of TTIs of the second CC.

Figure 10:
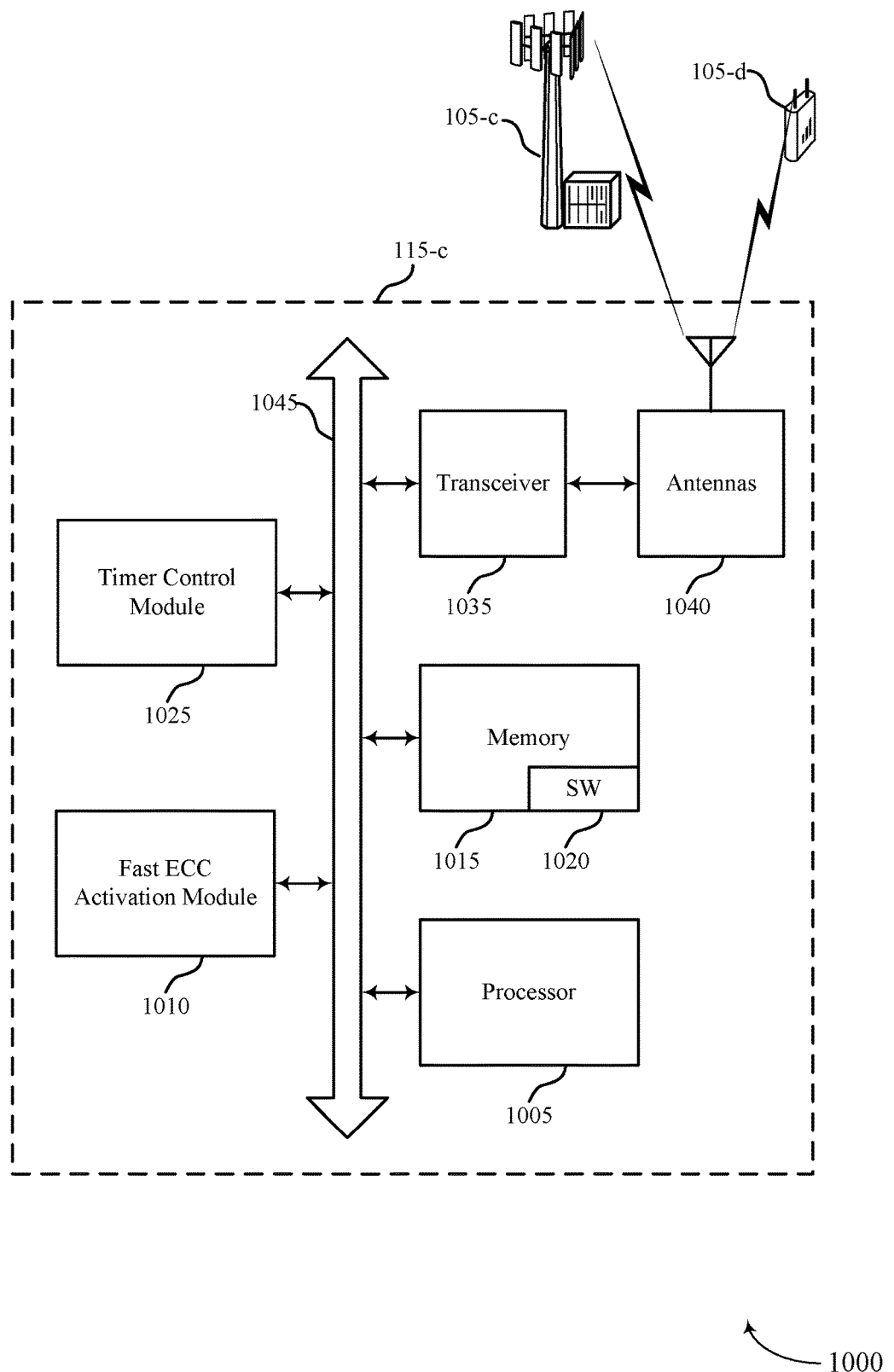
FIG. 10 illustrates an exemplary system including a user equipment (UE) that supports fast eCC activation in accordance with various aspects of the present disclosure.

FIG. 10 illustrates an exemplary system 1000 that supports fast eCC activation in accordance with various aspects of the present disclosure. System 1000 may include UE 115-*c*, which may be an example of a wireless device 700, a wireless device 800, or a UE 115 described herein with reference to FIGS. 1, 2, and 7-9. UE 115-*c* may include a fast eCC activation module 1010, which may be an example of a fast eCC activation module 710 described with reference to FIGS. 7-9. UE 115-*c* may also include a timer control module 1025. UE 115-*c* may also include components for bi-directional voice and data communications including components for transmitting communications and components for receiving communications. For example, UE 115-*c* may communicate bi-directionally with base stations 105-*c* or 105-*d*.

In some examples, timer control module 1025 may control (e.g., initiate, restart, etc.) various timers of UE 115-*c*. For instance, timer control module 1025 may initiate a monitoring timer; and timer control module 1025 may restart the monitoring timer if UE 115-*c* receives a preamble on an eCC from, for instance, base station 105-*c* while UE 115-*c* is monitoring the eCC.

UE 115-*c* may also include a processor 1005, and memory 1015 (including software (SW) 1020), a transceiver 1035, and one or more antenna(s) 1040, each of which may communicate, directly or indirectly, with one another (e.g., via buses 1045). The transceiver 1035 may communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040. While UE 115-*c* may include a single antenna 1040, UE 115-*c* may also have multiple antennas 1040 capable of concurrently transmitting or receiving multiple wireless transmissions.

The memory 1015 may include random access memory (RAM) and read only memory (ROM). The memory 1015 may store computer-readable, computer-executable software/firmware code 1020 including instructions that, when executed, cause the processor 1005 to perform various functions described herein (e.g., fast eCC activation, etc.). Alternatively, the software/firmware code 1020 may not be directly executable by the processor 1005 but cause a computer (e.g., when compiled and executed) to perform functions described herein. The processor 1005 may include an intelligent hardware device, (e.g., a central processing unit (CPU), a microcontroller, an ASIC, etc.)

Figure 11:
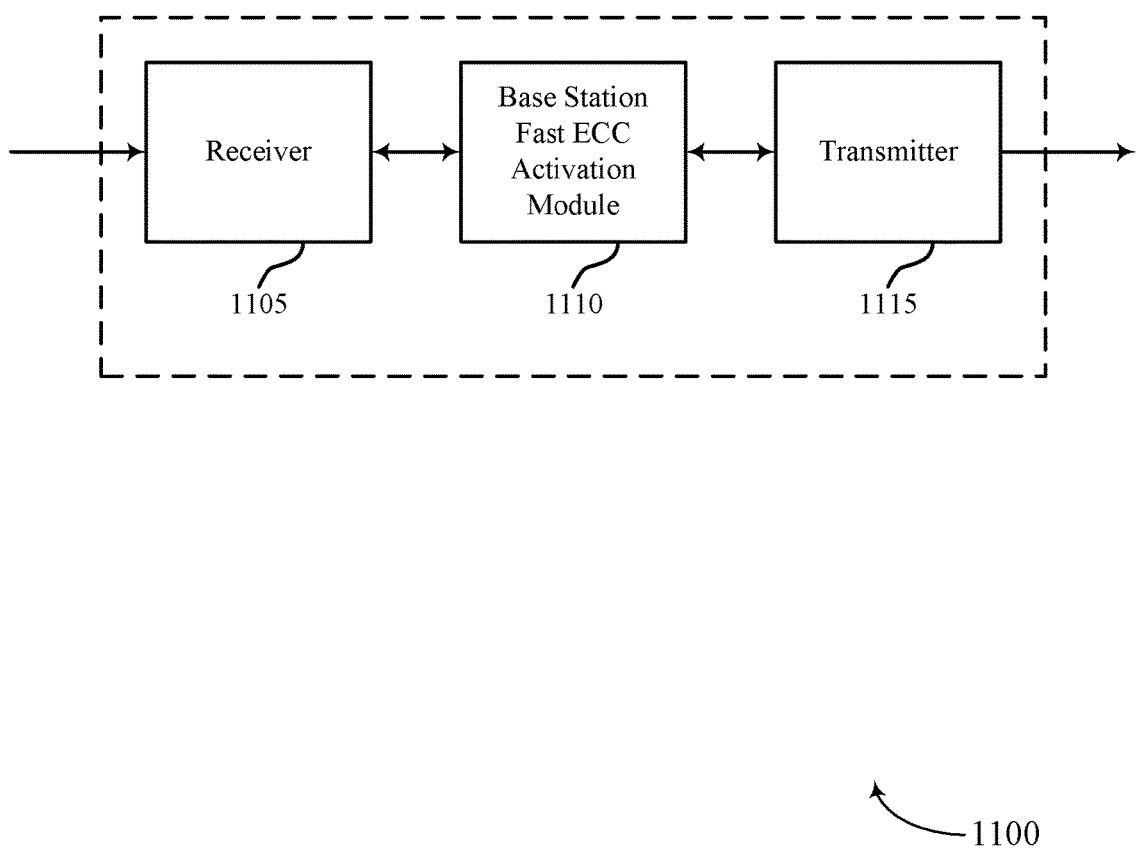
FIG. 11-13 illustrate an exemplary wireless device or devices that support fast eCC activation in accordance with various aspects of the present disclosure.

FIG. 11 shows an exemplary wireless device 1100 that support fast eCC activation in accordance with various aspects of the present disclosure. Wireless device 1100 may be an example of aspects of a base station 105 described with reference to FIGS. 1-6 and 10. Wireless device 1100 may include a receiver 1105, a base station fast eCC activation module 1110, or a transmitter 1115. Wireless device 1100 may also include a processor. Each of these components may be in communication with one another.

The receiver 1105 may receive information such as packets, user data, or control information associated with various information channels (e.g., control channels, data channels, and information related to fast eCC activation, etc.). Information may be passed on to the base station fast eCC activation module 1110, and to other components of wireless device 1100.

The base station fast eCC activation module 1110 may, in combination with transmitter 1115, transmit signaling indicative of a CA configuration including a first CC that utilizes a licensed frequency bandwidth and a second CC that utilizes an unlicensed frequency bandwidth; and it may transmit a control signal on the first CC indicative of a channel availability on the second CC.

The transmitter 1115 may transmit signals received from other components of wireless device 1100. In some examples, the transmitter 1115 may be collocated with the receiver 1105 in a transceiver module. The transmitter 1115 may include a single antenna, or it may include a plurality of antennas.

Figure 12:
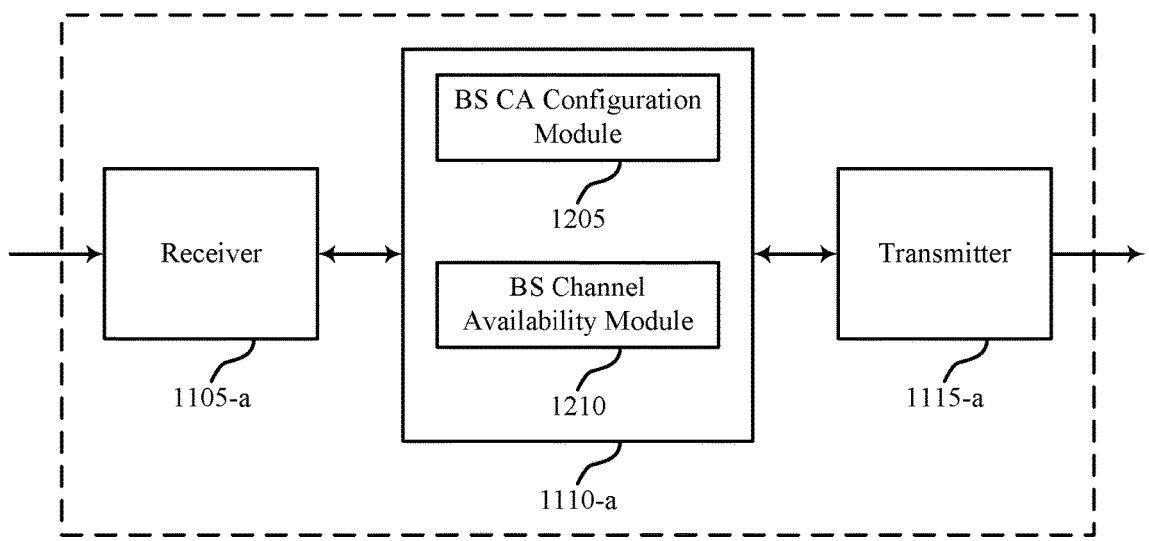

FIG. 12 shows an exemplary wireless device 1200 that support fast eCC activation in accordance with various aspects of the present disclosure. Wireless device 1200 may be an example of aspects of a wireless device 1100 or a base station 105 described with reference to FIGS. 1-6, 10, and 11. Wireless device 1200 may include a receiver 1105-*a*, a base station fast eCC activation module 1110-*a*, or a transmitter 1115-*a*. Wireless device 1200 may also include a processor. Each of these components may be in communication with one another. The base station fast eCC activation module 1110-*a* may also include a BS CA configuration module 1205, and a BS channel availability module 1210.

The receiver 1105-*a* may receive information, which may be passed on to base station fast eCC activation module 1110-*a*, and to other components wireless device 1200. The base station fast eCC activation module 1110-*a* may perform the operations described herein with reference to FIG. 11. The transmitter 1115-*a* may transmit signals received from other components of wireless device 1200.

The BS CA configuration module 1205 may transmit signaling indicative of a CA configuration including a first CC that utilizes a licensed frequency bandwidth and a second CC that utilizes an unlicensed frequency bandwidth, as described herein with reference to FIGS. 2-6. In some examples, the first CC is a PCC and the second CC is an eCC.

The BS channel availability module 1210 may transmit a control signal on the first CC indicative of a channel availability on the second CC, as described herein with reference to FIGS. 2-6. The control signal may a physical channel. In some examples, the control signal may be a subband of the bandwidth of the first CC.

Figure 13:
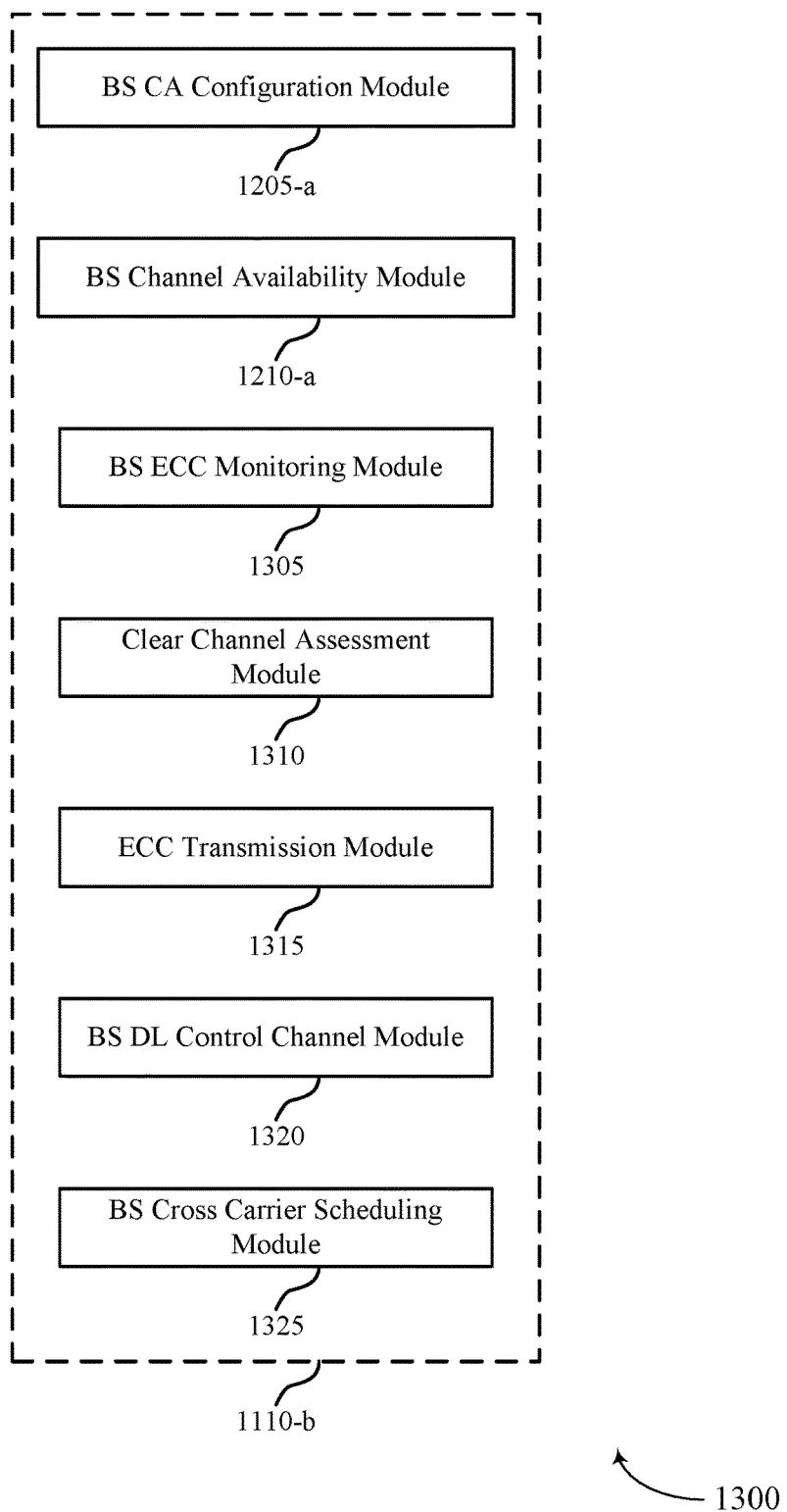

FIG. 13 shows a block diagram 1300 of a base station fast eCC activation module 1110-*b* which may be a component of a wireless device 1100 or a wireless device 1200 that supports fast eCC activation in accordance with various aspects of the present disclosure. The base station fast eCC activation module 1110-*b* may be an example of aspects of a base station fast eCC activation module 1110 described with reference to FIGS. 11 and 12. The base station fast eCC activation module 1110-*b* may include a BS CA configuration module 1205-*a*, and a BS channel availability module 1210-*a*. Each of these modules may perform the functions described herein with reference to FIG. 12. The base station fast eCC activation module 1110-*b* may also include a BS eCC monitoring module 1305, a clear channel assessment module 1310, an eCC transmission module 1315, a BS DL control channel module 1320, and a BS cross carrier scheduling module 1325.

The BS eCC monitoring module 1305 may be configured to cause wireless device 1100 or 1200 to multicast a control signal to a plurality of devices configured to monitor the second CC upon receipt of the control signal, as described herein with reference to FIGS. 2-6.

The clear channel assessment module 1310 may determine that a channel of the second CC is available for communication after transmitting the control signal, as described herein with reference to FIGS. 2-6. The clear channel assessment module 1310 may also determine that a channel of the second CC is available for communication, such that the control signal may transmitted after the determination that the channel of the second CC is available.

The eCC transmission module 1315 may transmit a preamble on the second CC, as described herein with reference to FIGS. 2-6. The eCC transmission module 1315 may also transmit a channel usage beacon on the second CC.

The BS DL control channel module 1320 may transmit a PDCCH or a PDSCH on the second CC, and the PDCCH or the PDSCH may schedule resources of the second CC, as described herein with reference to FIGS. 2-6. The BS DL control channel module 1320 may, in some examples, transmit a PDCCH message on the first CC, and the PDCCH message may schedule resources of the second CC. In some examples, a duration of transmission TTIs of the first CC are different from a duration of TTIs of the second CC, and the PDCCH message may be transmitted in a TTI of the first CC and may assign a TTI of the second CC that overlaps in time with the TTI of the first CC. In some examples, a duration of TTIs of the first CC are different from a duration of TTIs of the second CC, and the PDCCH message may be transmitted in a TTI of the first CC and may assign a TTI of the second CC that overlaps in time with a subsequent TTI of the first CC.

The BS cross carrier scheduling module 1325 may cause wireless device 1100 or 1200 to multicast the control signal to several devices configured to monitor the first CC for the PDCCH message beginning at a first determinative time after receipt of the control signal, and to monitor the second CC a second determinative time after receipt of the control signal, as described herein with reference to FIGS. 2-6. In some examples, the first determinative time includes a number of TTIs of the first CC and second determinative time may include a number of TTIs of the second CC. In some examples, BS cross carrier scheduling module 1325 causes wireless device 1100 or 1200 to multicast the control signal to several devices configured to monitor the first CC for the PDCCH message beginning at a first determinative time after receiving the control signal, and to monitor the second CC for a data channel in response to receiving the PDCCH message.

The components of wireless devices 700, 800, 1100, and 1200, and fast eCC activation module 710-*b* and base station fast eCC activation module 1110-*b* may each, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
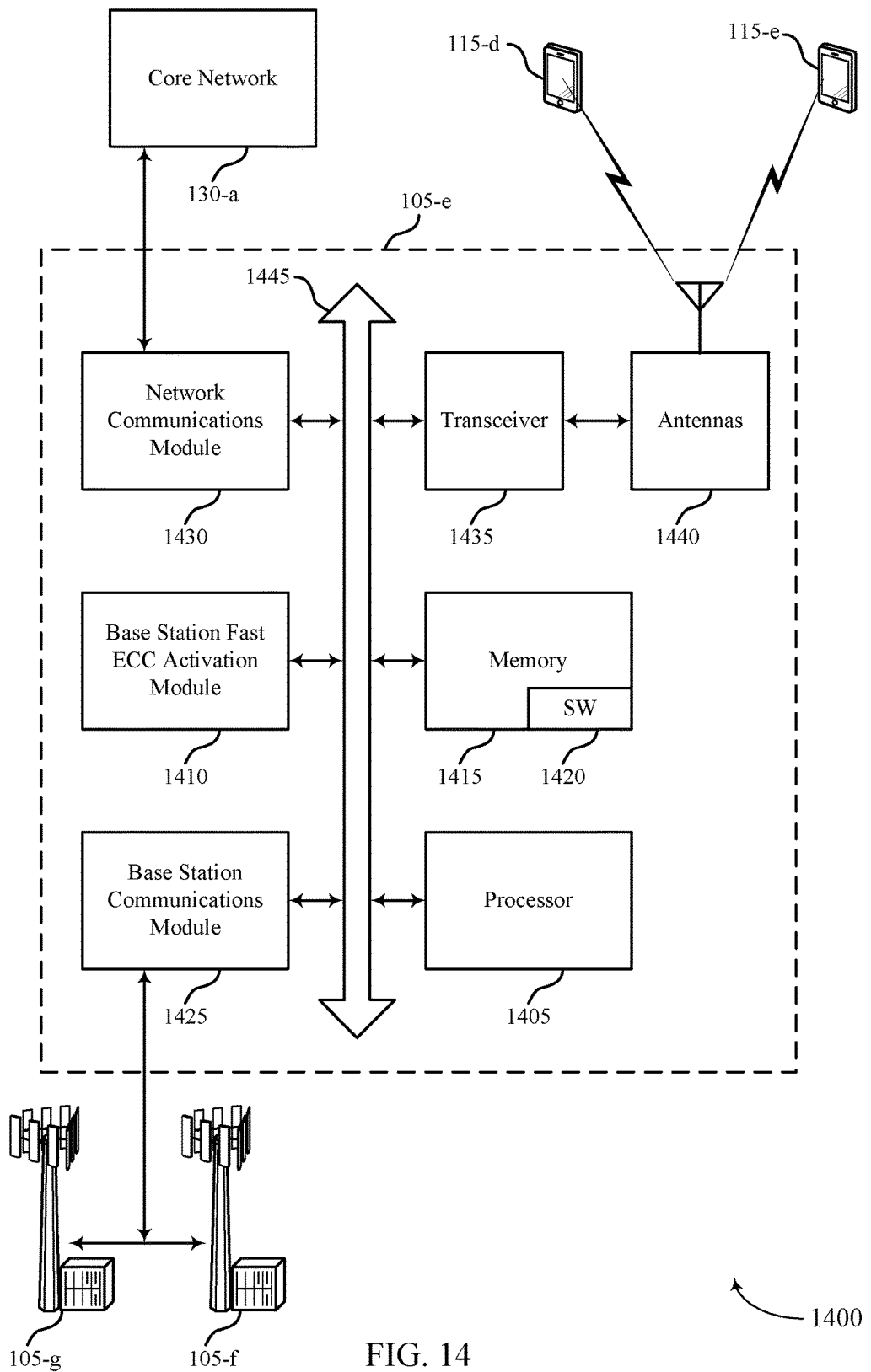
FIG. 14 illustrates an exemplary system including a base station that supports fast eCC activation in accordance with various aspects of the present disclosure.

FIG. 14 shows a diagram of a system 1400 including a base station 105 configured for fast eCC activation in accordance with various aspects of the present disclosure. System 1400 may include base station 105-*e*, which may be an example of a wireless device 1100, a wireless device 1200, or a base station 105 described herein with reference to FIGS. 1, 2 and 11-13. Base Station 105-*e* may include a base station fast eCC activation module 1410, which may be an example of a base station fast eCC activation module 1110 described with reference to FIGS. 11-13. Base Station 105-*e* may also include components for bi-directional voice and data communications including components for transmitting communications and components for receiving communications. For example, base station 105-*e* may communicate bi-directionally with base station 105-*f* or UE 115-*g*.

In some cases, base station 105-*e* may have one or more wired backhaul links. Base station 105-*e* may have a wired backhaul link (e.g., S1 interface, etc.) to the core network 130-*a*. Base station 105-*e* may also communicate with other base stations 105, such as base station 105-*f* and base station 105-*g* via inter-base station backhaul links (e.g., an X2 interface). Each of the base stations 105 may communicate with UEs 115 using the same or different wireless communications technologies. In some cases, base station 105-*e* may communicate with other base stations such as 105-*f* or 105-*g* utilizing base station communication module 1425. In some examples, base station communication module 1425 may provide an X2 interface within an LTE/LTE-A wireless communication network technology to provide communication between some of the base stations 105. In some examples, base station 105-*e* may communicate with other base stations through core network 130-*a*. In some cases, base station 105-*e* may communicate with the core network 130-*e* through network communications module 1430.

The base station 105-*e* may include a processor 1405, memory 1415 (including software (SW) 1420), transceiver 1435, and antenna(s) 1440, which each may be in communication, directly or indirectly, with one another (e.g., over bus system 1445). The transceivers 1435 may be configured to communicate bi-directionally, via the antenna(s) 1440, with the UEs 115, which may be multi-mode devices. The transceiver 1435 (or other components of the base station 105-*e*) may also be configured to communicate bi-directionally, via the antennas 1440, with one or more other base stations (not shown). The transceiver 1435 may include a modem configured to modulate the packets and provide the modulated packets to the antennas 1440 for transmission, and to demodulate packets received from the antennas 1440. The base station 105-*e* may include multiple transceivers 1435, each with one or more associated antennas 1440. The transceiver may be an example of a combined receiver 1105 and transmitter 1115 of FIG. 11.

The memory 1415 may include RAM and ROM. The memory 1415 may also store computer-readable, computer-executable software code 1420 containing instructions that are configured to, when executed, cause the processor 1410 to perform various functions described herein (e.g., fast eCC activation, selecting coverage enhancement techniques, call processing, database management, message routing, etc.). Alternatively, the software 1420 may not be directly executable by the processor 1405 but be configured to cause the computer, e.g., when compiled and executed, to perform functions described herein. The processor 1405 may include an intelligent hardware device, e.g., a CPU, a microcontroller, an ASIC, etc. The processor 1405 may include various special purpose processors such as encoders, queue processing modules, base band processors, radio head controllers, digital signal processor (DSPs), and the like.

The base station communications module 1425 may manage communications with other base stations 105. The communications management module may include a controller or scheduler for controlling communications with UEs 115 in cooperation with other base stations 105. For example, the base station communications module 1425 may coordinate scheduling for transmissions to UEs 115 for various interference mitigation techniques such as beamforming or joint transmission.

Figure 15:
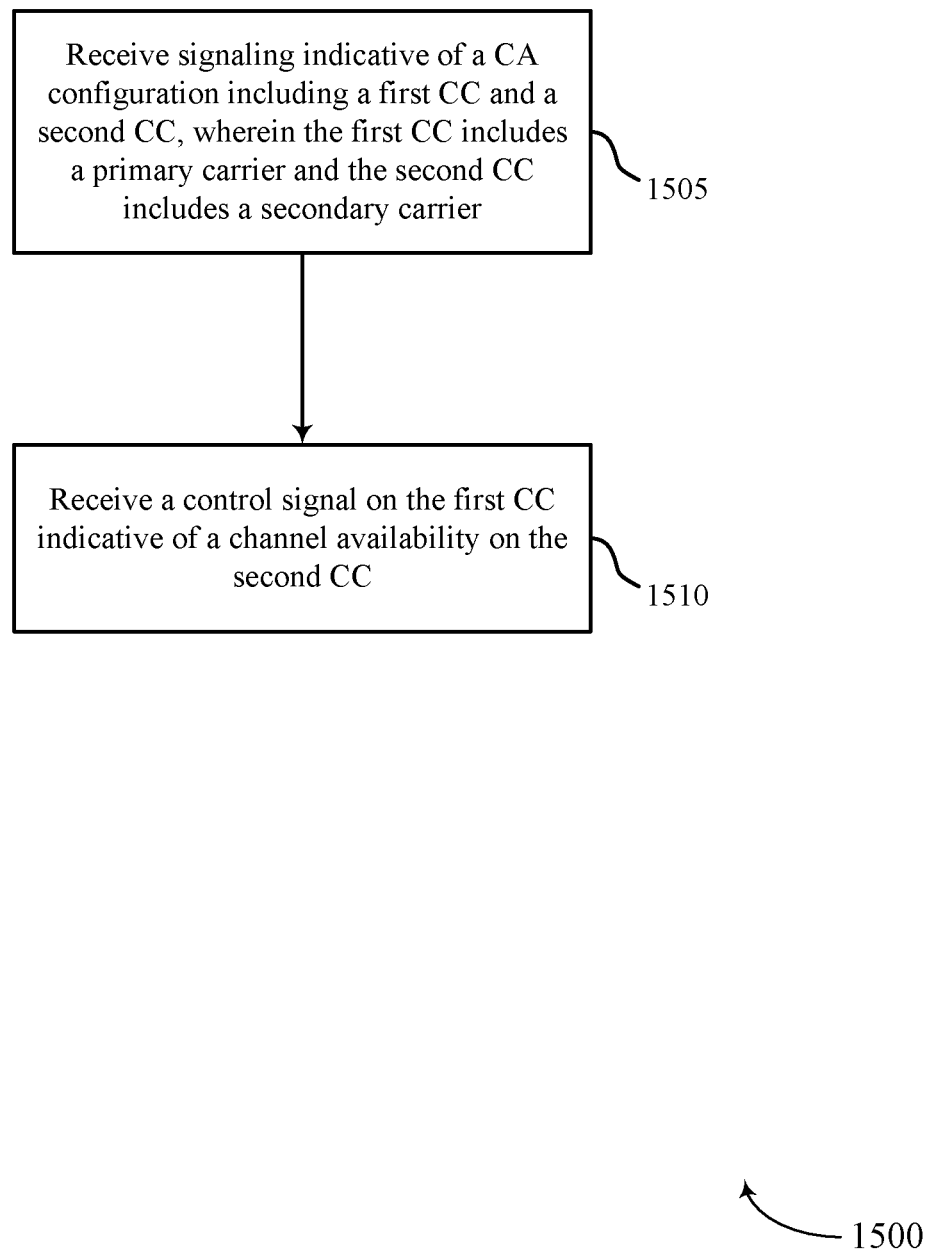
FIG. 15-20 illustrate exemplary methods for fast eCC activation in accordance with various aspects of the present disclosure.

FIG. 15 shows a flowchart illustrating a method 1500 for fast eCC activation in accordance with various aspects of the present disclosure. The operations of method 1500 may be implemented by a UE 115 or its components as described with reference to FIGS. 1-10, and 14. For example, the operations of method 1500 may be performed by the fast eCC activation module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware.

At block 1505, the UE 115 may receive signaling indicative of a CA configuration including a first CC and a second CC, as described herein with reference to FIGS. 2-6. In some cases, the first CC may include a primary carrier and the second CC may include a secondary carrier. The primary carrier (or first CC) and the secondary carrier (or second CC) may utilize a licensed frequency bandwidth or an unlicensed frequency bandwidth. For example, the primary carrier (or first CC) may utilize a licensed frequency bandwidth and the secondary carrier (or second CC) may utilize an unlicensed frequency bandwidth. In certain examples, the operations of block 1505 may be performed by the CA configuration module 805, as described herein with reference to FIG. 8.

At block 1510, the UE 115 may receive a control signal on the first CC indicative of a channel availability on the second CC, as described herein with reference to FIGS. 2-6. In certain examples, the operations of block 1510 may be performed by the channel availability module 810, as described herein with reference to FIG. 8.

Figure 16:
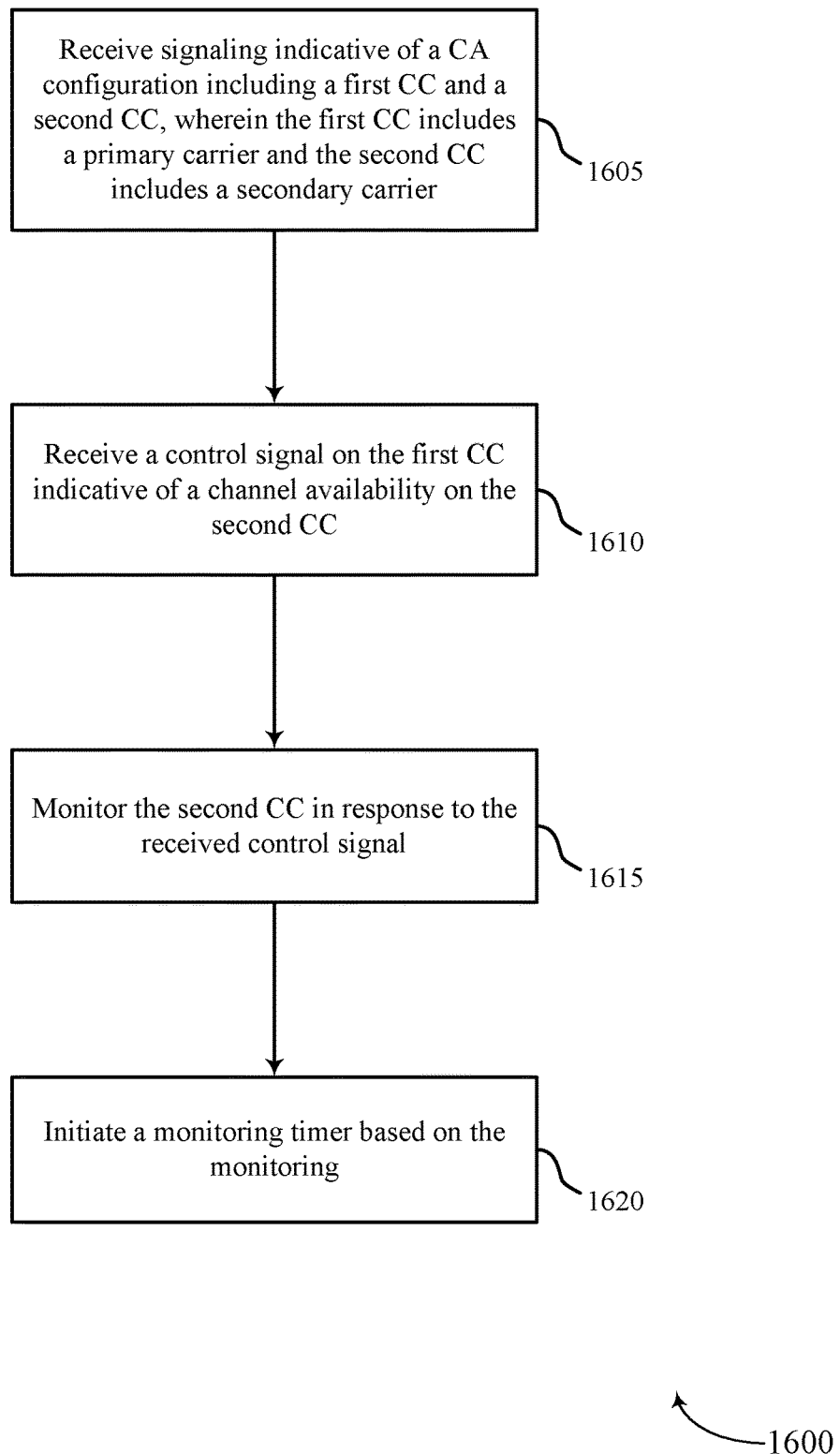

FIG. 16 shows a flowchart illustrating a method 1600 for fast eCC activation in accordance with various aspects of the present disclosure. The operations of method 1600 may be implemented by a UE 115 or its components, as described with reference to FIGS. 1-10, and 14. For example, the operations of method 1600 may be performed by the fast eCC activation module 710, as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of method 1500 of FIG. 15.

At block 1605, the UE 115 may receive signaling indicative of a CA configuration including a first CC and a second CC, as described herein with reference to FIGS. 2-6. In some cases, the first CC may include a primary carrier and the second CC may include a secondary carrier. The primary carrier (or first CC) and the secondary carrier (or second CC) may utilize a licensed frequency bandwidth or an unlicensed frequency bandwidth. For example, the primary carrier (or first CC) may utilize a licensed frequency bandwidth and the secondary carrier (or second CC) may utilize an unlicensed frequency bandwidth. In certain examples, the operations of block 1605 may be performed by the CA configuration module 805, as described herein with reference to FIG. 8.

At block 1610, the UE 115 may receive a control signal on the first CC indicative of a channel availability on the second CC, as described herein with reference to FIGS. 2-6. In certain examples, the operations of block 1610 may be performed by the channel availability module 810, as described herein with reference to FIG. 8.

At block 1615, the UE 115 may monitor the second CC in response to the received control signal, as described herein with reference to FIGS. 2-6. In certain examples, the operations of block 1615 may be performed by the eCC monitoring module 905, as described herein with reference to FIG. 9.

At block 1620, the UE 115 may initiate a monitoring timer based at least in part on the monitoring, as described herein with reference to FIGS. 2-6. In certain examples, the operations of block 1620 may be performed by the monitoring timer module 910, as described herein with reference to FIG. 9. The UE 115 may receive a preamble transmission on the second CC, and it may restart the monitoring timer in response to the received preamble transmission. Alternatively, UE 115 may determine that the monitoring timer has expired before a preamble transmission is received on the second CC, and it may cease the monitoring of the second CC.

Figure 17:
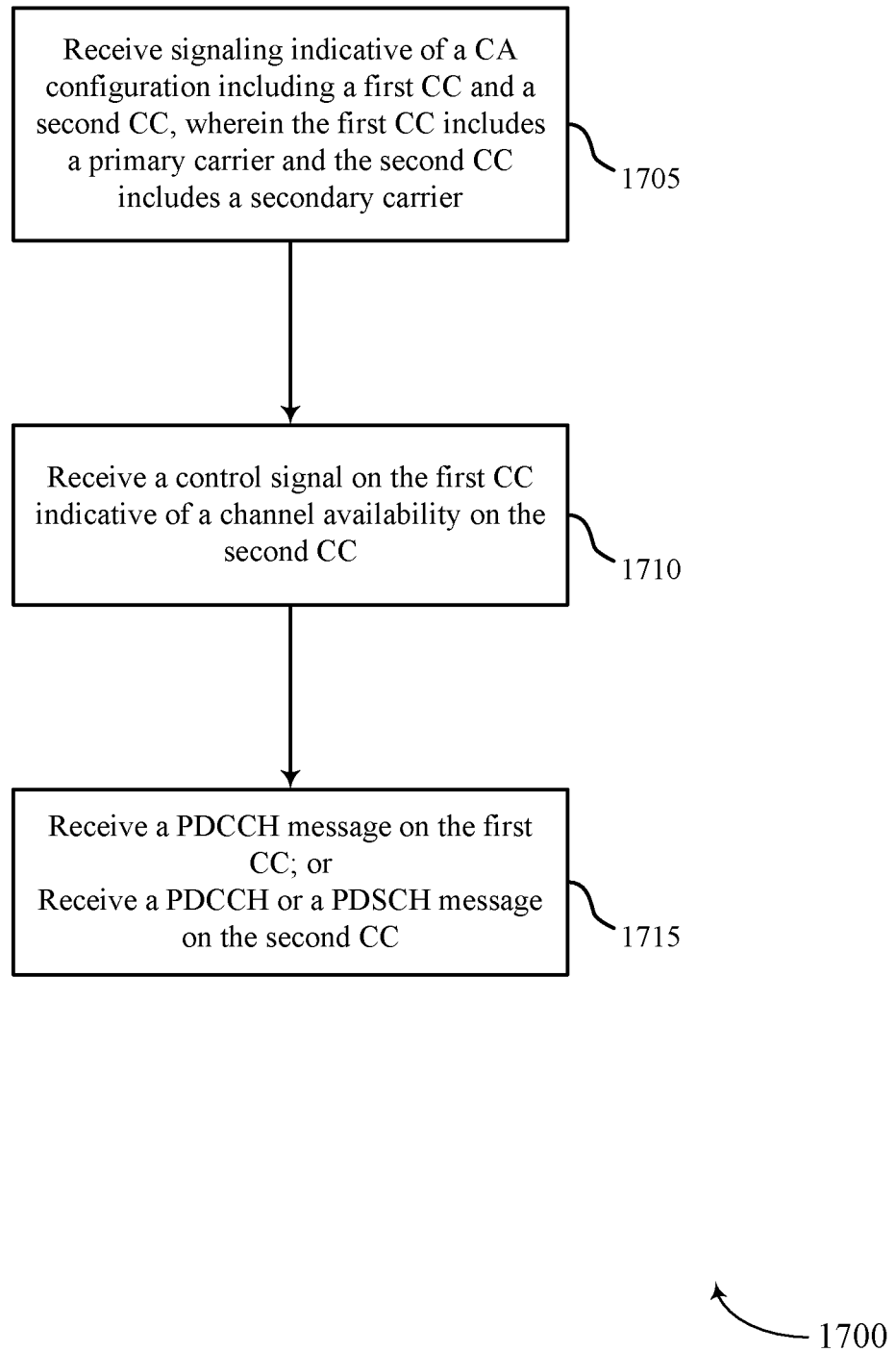

FIG. 17 shows a flowchart illustrating a method 1700 for fast eCC activation in accordance with various aspects of the present disclosure. The operations of method 1700 may be implemented by a UE 115 or its components as described with reference to FIGS. 1-10, and 14. For example, the operations of method 1700 may be performed by the fast eCC activation module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1500 or 1600 of FIGS. 15 and 16.

At block 1705, the UE 115 may receive signaling indicative of a CA configuration including a first CC and a second CC, as described herein with reference to FIGS. 2-6. In some cases, the first CC may include a primary carrier and the second CC may include a secondary carrier. The primary carrier (or first CC) and the secondary carrier (or second CC) may utilize a licensed frequency bandwidth or an unlicensed frequency bandwidth. For example, the primary carrier (or first CC) may utilize a licensed frequency bandwidth and the secondary carrier (or second CC) may utilize an unlicensed frequency bandwidth. In certain examples, the operations of block 1705 may be performed by the CA configuration module 805, as described herein with reference to FIG. 8.

At block 1710, the UE 115 may receive a control signal on the first CC indicative of a channel availability on the second CC, as described herein with reference to FIGS. 2-6. In certain examples, the operations of block 1710 may be performed by the channel availability module 810 as described herein with reference to FIG. 8.

At block 1715, the UE 115 may receive a PDCCH message on the first CC, and the PDCCH message schedules resources of the second CC as described herein with reference to FIGS. 2, 4A-5B, and 6. Alternatively, the UE 115 may receive a PDCCH or PDSCH message on the second CC, which may schedule resources of the second CC, as described herein with reference to FIGS. 2, 3A, 3B, and 6. In certain examples, the operations of block 1715 may be performed by the DL control channel module 915, as described herein with reference to FIG. 9.

Figure 18:
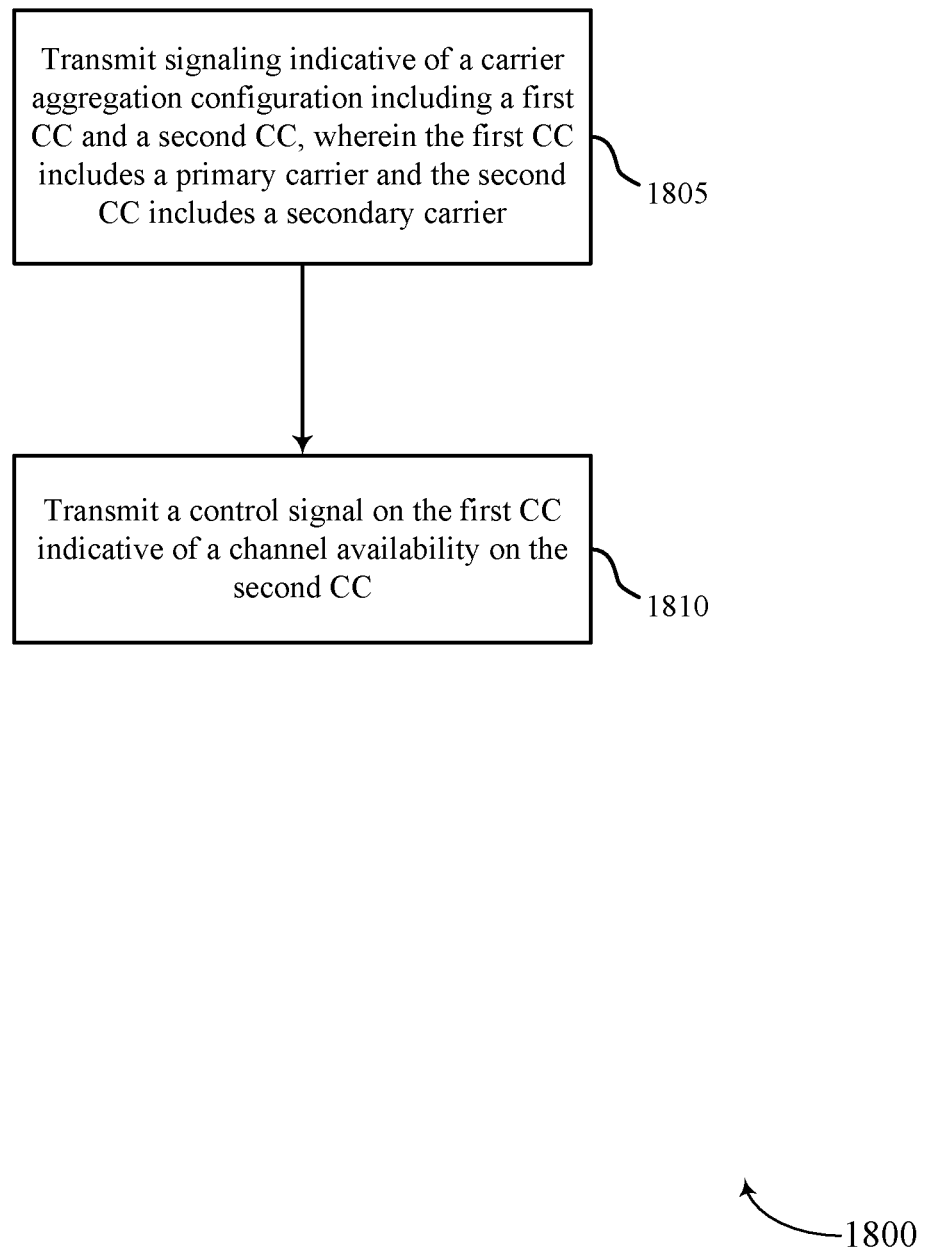

FIG. 18 shows a flowchart illustrating a method 1800 for fast eCC activation in accordance with various aspects of the present disclosure. The operations of method 1800 may be implemented by a base station 105 or its components as described with reference to FIGS. 1-6 and 10-14. For example, the operations of method 1800 may be performed by the base station fast eCC activation module 1110, as described with reference to FIGS. 11-14. In some examples, a base station 105 may execute a set of codes to control the functional elements of the base station 105 to perform the functions described below. Additionally or alternatively, the base station 105 may perform aspects the functions described below using special-purpose hardware.

At block 1805, the base station 105 may transmit signaling indicative of a CA configuration including a first CC and a second CC, as described herein with reference to FIGS. 2-6. In some cases, the first CC may include a primary carrier and the second CC may include a secondary carrier. The primary carrier (or first CC) and the secondary carrier (or second CC) may utilize a licensed frequency bandwidth or an unlicensed frequency bandwidth. For example, the primary carrier (or first CC) may utilize a licensed frequency bandwidth and the secondary carrier (or second CC) may utilize an unlicensed frequency bandwidth. In certain examples, the operations of block 1805 may be performed by the BS CA configuration module 1205, as described herein with reference to FIG. 12.

At block 1810, the base station 105 may transmit a control signal on the first CC indicative of a channel availability on the second CC, as described herein with reference to FIGS. 2-6. In certain examples, the operations of block 1810 may be performed by the BS channel availability module 1210, as described herein with reference to FIG. 12.

Figure 19:
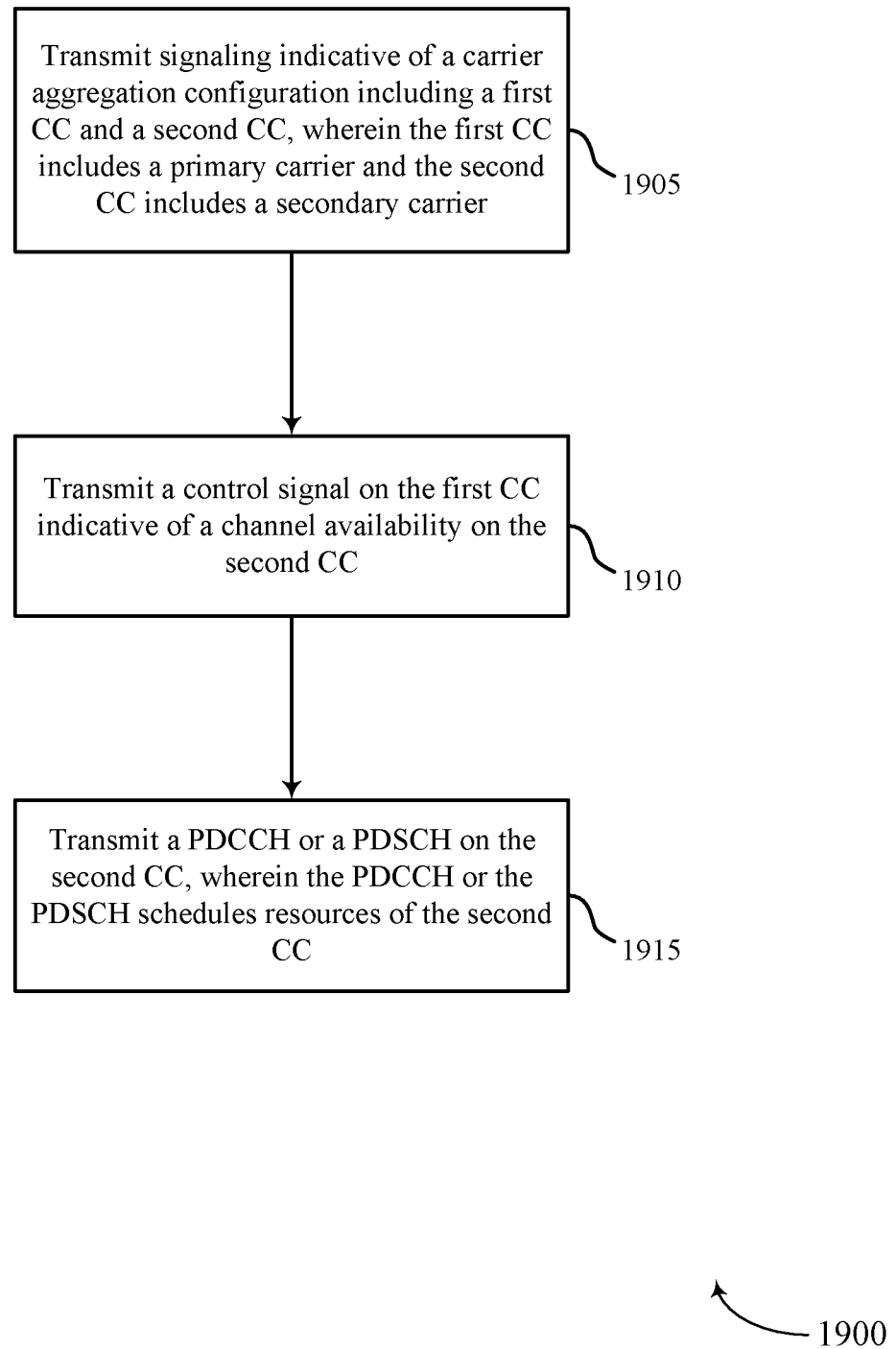

FIG. 19 shows a flowchart illustrating a method 1900 for fast eCC activation in accordance with various aspects of the present disclosure. The operations of method 1900 may be implemented by a base station 105 or its components as described with reference to FIGS. 1-6 and 10-14. For example, the operations of method 1900 may be performed by the base station fast eCC activation module 1110, as described with reference to FIGS. 11-14. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of the methods 1800 of FIG. 18.

At block 1905, the base station 105 may transmit signaling indicative of a CA configuration including a first CC and a second CC, as described herein with reference to FIGS. 2-6. In some cases, the first CC may include a primary carrier and the second CC may include a secondary carrier. The primary carrier (or first CC) and the secondary carrier (or second CC) may utilize a licensed frequency bandwidth or an unlicensed frequency bandwidth. For example, the primary carrier (or first CC) may utilize a licensed frequency bandwidth and the secondary carrier (or second CC) may utilize an unlicensed frequency bandwidth. In certain examples, the operations of block 1905 may be performed by the BS CA configuration module 1205, as described herein with reference to FIG. 12.

At block 1910, the base station 105 may transmit a control signal on the first CC indicative of a channel availability on the second CC, as described herein with reference to FIGS. 2-6. In certain examples, the operations of block 1910 may be performed by the BS channel availability module 1210, as described herein with reference to FIG. 12.

At block 1915, the base station 105 may transmit a PDCCH or a PDSCH on the second CC, and the PDCCH or the PDSCH may schedule resources of the second CC as described herein with reference to FIGS. 2, 3A, 3B, and 6. In certain examples, the operations of block 1915 may be performed by the BS DL control channel module 1320, as described herein with reference to FIG. 13.

Figure 20:
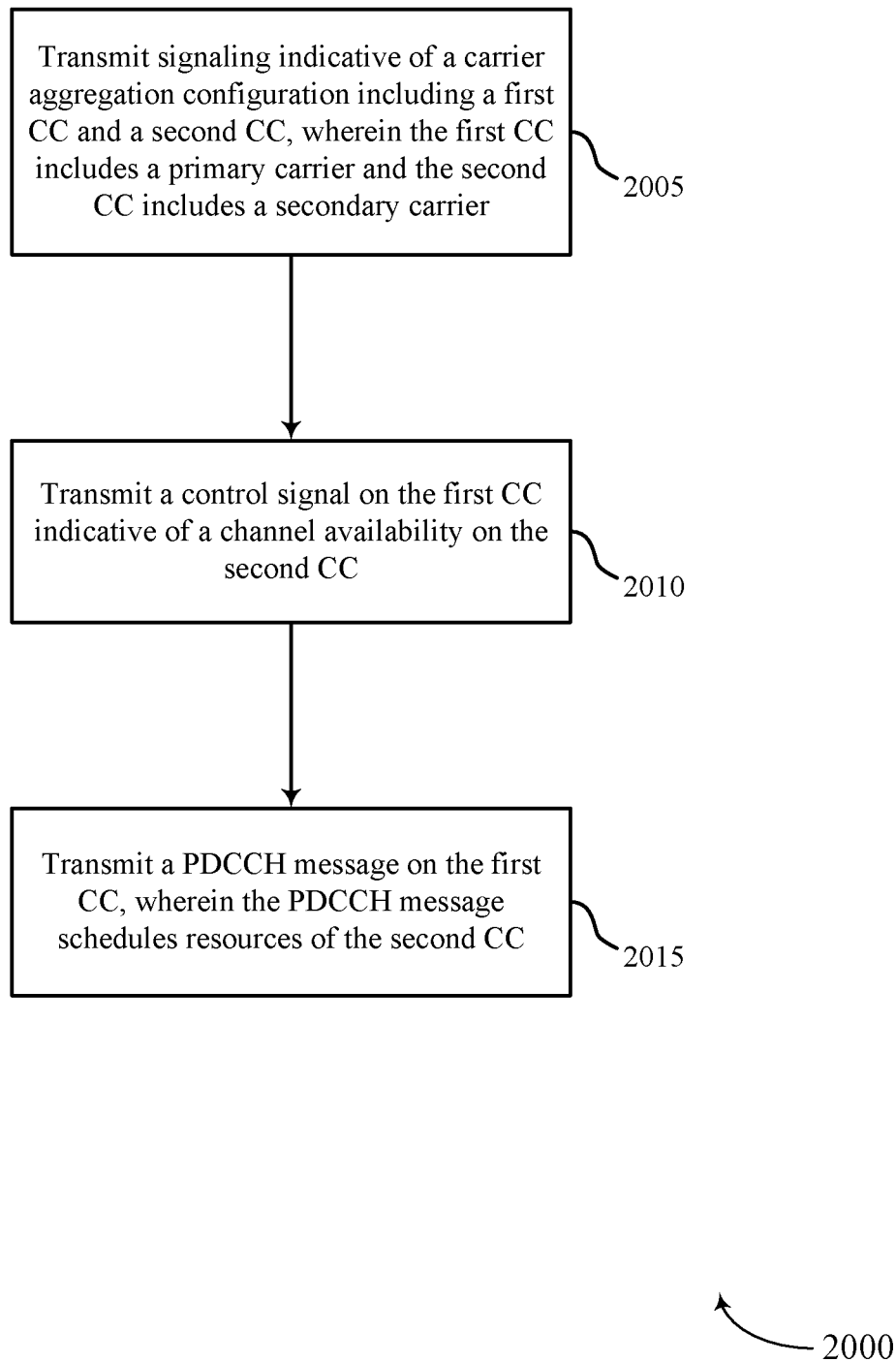

FIG. 20 shows a flowchart illustrating a method 2000 for fast eCC activation in accordance with various aspects of the present disclosure. The operations of method 2000 may be implemented by a base station 105 or its components as described with reference to FIGS. 1-6 and 10-14. For example, the operations of method 2000 may be performed by the base station fast eCC activation module 1110, as described with reference to FIGS. 11-14. In some examples, a base station 105 may execute a set of codes to control the functional elements of the base station 105 to perform the functions described below. Additionally or alternatively, the base station 105 may perform aspects the functions described below using special-purpose hardware. The method 2000 may also incorporate aspects of methods 1800 or 1900 of FIGS. 18 and 19.

At block 2005, the base station 105 may transmit signaling indicative of a CA configuration that includes a first CC and a second CC, as described herein with reference to FIGS. 2-6. In some cases, the first CC may include a primary carrier and the second CC may include a secondary carrier. The primary carrier (or first CC) and the secondary carrier (or second CC) may utilize a licensed frequency bandwidth or an unlicensed frequency bandwidth. For example, the primary carrier (or first CC) may utilize a licensed frequency bandwidth and the secondary carrier (or second CC) may utilize an unlicensed frequency bandwidth. In certain examples, the operations of block 2005 may be performed by the BS CA configuration module 1205 as described herein with reference to FIG. 12.

At block 2010, the base station 105 may transmit a control signal on the first CC indicative of a channel availability on the second CC, as described herein with reference to FIGS. 2-6. In certain examples, the operations of block 2010 may be performed by the BS channel availability module 1210, as described herein with reference to FIG. 12.

At block 2015, the base station 105 may transmit a PDCCH message on the first CC, and the PDCCH message may schedule resources of the second CC as described herein with reference to FIGS. 2, 4A-5B, and 6. In certain examples, the operations of block 2015 may be performed by the BS DL control channel module 1320 as described herein with reference to FIG. 13.

Methods 1500, 1600, 1700, 1800, 1900, and 2000 may thus provide for fast eCC activation. It should be noted that methods 1500, 1600, 1700, 1800, 1900, and 2000 describe possible implementations, and that the operations and the steps may be rearranged or otherwise modified such that other implementations are possible. In some examples, aspects from two or more of the methods 1500, 1600, 1700, 1800, 1900, and 2000 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, systems 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
receiving signaling indicative of a carrier aggregation (CA) configuration comprising a first component carrier (CC) and a second CC, wherein the first CC comprises a primary carrier utilizing a licensed frequency bandwidth and the second CC comprises a secondary carrier utilizing an unlicensed frequency bandwidth;
receiving a control signal on the licensed frequency bandwidth of the first CC that indicates a channel availability on the unlicensed frequency bandwidth of the second CC;
receiving a physical downlink control channel (PDCCH) message on the first CC, wherein the PDCCH message schedules resources of the second CC, wherein a duration of transmission time intervals (TTIs) in the second CC is shorter than a duration of TTIs in the first CC of the first CC, and wherein the PDCCH message is transmitted in a first TTI of the first CC and assigns a TTI of the second CC that at least partially overlaps in time with a subsequent TTI of the first CC, the subsequent TTI of the first CC being subsequent to the first TTI of the first CC; and
monitoring the second CC in response to the received control signal.

2. The method of claim 1, further comprising:
initiating a monitoring timer based at least in part on the monitoring.

3. The method of claim 2, further comprising:
receiving a preamble transmission on the second CC; and
restarting the monitoring timer in response to the received preamble transmission.

4. The method of claim 2, further comprising:
determining that the monitoring timer has expired before a preamble transmission is received on the second CC; and
ceasing the monitoring of the second CC.

5. The method of claim 1, further comprising:
receiving a PDCCH or physical downlink shared channel (PDSCH) message on the second CC, wherein the PDCCH or PDSCH message schedules resources of the second CC.

6. The method of claim 1, further comprising:
monitoring the first CC for the PDCCH message beginning at a first determinative time after receiving the control signal;
wherein monitoring the second CC comprises monitoring the second CC beginning at a second determinative time after receiving the control signal; and
wherein the first determinative time comprises a number of TTIs of the first CC and the second determinative time comprises a number of TTIs of the second CC.

7. The method of claim 1, further comprising:
monitoring the first CC for the PDCCH message beginning at a first determinative time after receiving the control signal; and
wherein monitoring the second CC comprises monitoring the second CC for a data channel in response to receiving the PDCCH message.

8. The method of claim 1, wherein the control signal comprises a physical channel.

9. The method of claim 8, wherein the control signal comprises a subband of the licensed frequency bandwidth of the first CC.

10. The method of claim 8, wherein the physical channel comprises a PDCCH format for user equipment (UEs) configured to monitor the second CC upon receipt of the control signal.

11. The method of claim 1, wherein the primary carrier comprises a primary component carrier (PCC) and the secondary carrier comprises an enhanced component carrier (eCC).

12. An apparatus for wireless communication, comprising:
means for receiving signaling indicative of a carrier aggregation (CA) configuration comprising a first component carrier (CC) and a second CC, wherein the first CC comprises a primary carrier utilizing a licensed frequency bandwidth and the second CC comprises a secondary carrier utilizing an unlicensed frequency bandwidth;
means for receiving a control signal on the licensed frequency bandwidth of the first CC that indicates a channel availability on the unlicensed frequency bandwidth of the second CC;
means for receiving a physical downlink control channel (PDCCH) message on the first CC, wherein the PDCCH message schedules resources of the second CC, wherein a duration of transmission time intervals (TTIs) in the second CC is shorter than a duration of TTIs in the first CC of the first CC, and wherein the PDCCH message is transmitted in a first TTI of the first CC and assigns a TTI of the second CC that at least partially overlaps in time with a subsequent TTI of the first CC, the subsequent TTI of the first CC being subsequent to the first TTI of the first CC; and
means for monitoring the second CC in response to the received control signal.

13. An apparatus for wireless communication, comprising:
a processor;
memory in electronic communication with the processor; and
instructions stored in the memory and operable, when executed by the processor, to cause the apparatus to:
receive signaling indicative of a carrier aggregation (CA) configuration comprising a first component carrier (CC) and a second CC, wherein the first CC comprises a primary carrier utilizing a licensed frequency bandwidth and the second CC comprises a secondary carrier utilizing an unlicensed frequency bandwidth;
receive a control signal on the licensed frequency bandwidth of the first CC that indicates a channel availability on the unlicensed frequency bandwidth of the second CC;
receive a physical downlink control channel (PDCCH) message on the first CC, wherein the PDCCH message schedules resources of the second CC, wherein a duration of transmission time intervals (TTIs) in the second CC is shorter than a duration of TTIs in the first CC of the first CC, and wherein the PDCCH message is transmitted in a first TTI of the first CC and assigns a TTI of the second CC that at least partially overlaps in time with a subsequent TTI of the first CC, the subsequent TTI of the first CC being subsequent to the first TTI of the first CC; and monitor the second CC in response to the received control signal.

14. The apparatus of claim 13, wherein the instructions are operable to cause the apparatus to:
   initiate a monitoring timer based at least in part on the monitoring.

15. The apparatus of claim 14, wherein the instructions are operable to cause the apparatus to:
   receive a preamble transmission on the second CC; and
   restart the monitoring timer in response to the received preamble transmission.

16. The apparatus of claim 14, wherein the instructions are operable to cause the apparatus to:
   determine that the monitoring timer has expired before a preamble transmission is received on the second CC; and
   cease the monitoring of the second CC.

17. The apparatus of claim 13, wherein the instructions are operable to cause the apparatus to:
   receive a PDCCH or physical downlink shared channel (PDSCH) message on the second CC, wherein the PDCCH or PDSCH message schedules resources of the second CC.

18. A non-transitory computer-readable medium storing code for wireless communication, the code comprising instructions executable by a processor to:
   receive signaling indicative of a carrier aggregation (CA) configuration comprising a first component carrier (CC) and a second CC, wherein the first CC comprises a primary carrier utilizing a licensed frequency bandwidth and the second CC comprises a secondary carrier utilizing an unlicensed frequency bandwidth;
   receive a control signal on the licensed frequency bandwidth of the first CC that indicates a channel availability on the unlicensed frequency bandwidth of the second CC;
   receive a physical downlink control channel (PDCCH) message on the first CC, wherein the PDCCH message schedules resources of the second CC, wherein a duration of transmission time intervals (TTIs) in the second CC is shorter than a duration of TTIs in the first CC of the first CC, and wherein the PDCCH message is transmitted in a first TTI of the first CC and assigns a TTI of the second CC that at least partially overlaps in time with a subsequent TTI of the first CC, the subsequent TTI of the first CC being subsequent to the first TTI of the first CC; and
   monitor the second CC in response to the received control signal.

* * * * *